US008873410B2

(12) United States Patent
Pruthi et al.

(10) Patent No.: US 8,873,410 B2
(45) Date of Patent: Oct. 28, 2014

(54) APPARATUS AND METHOD FOR COLLECTING AND ANALYZING COMMUNICATIONS DATA

(75) Inventors: Parag Pruthi, East Brunswick, NJ (US); Andrew Heybey, York, PA (US)

(73) Assignee: Niksun, Inc., Princeton, NJ (US)

( * ) Notice: Subject to any disclaimer, the term of this patent is extended or adjusted under 35 U.S.C. 154(b) by 0 days.

(21) Appl. No.: 13/330,911

(22) Filed: Dec. 20, 2011

(65) Prior Publication Data

US 2012/0092343 A1 Apr. 19, 2012

Related U.S. Application Data

(60) Continuation of application No. 12/364,355, filed on Feb. 2, 2009, now Pat. No. 8,102,782, which is a division of application No. 09/863,593, filed on May 23, 2001, now Pat. No. 7,492,720, which is a continuation of application No. PCT/US99/27969, filed on Nov. 23, 1999.

(60) Provisional application No. 60/109,718, filed on Nov. 24, 1998.

(51) Int. Cl.
*G06F 11/30* (2006.01)
*H04L 12/26* (2006.01)
*H04L 12/24* (2006.01)

(52) U.S. Cl.
CPC ............ *H04L 41/22* (2013.01); *H04L 43/0852* (2013.01); *H04L 43/0858* (2013.01); *H04L 43/045* (2013.01); *H04L 41/5029* (2013.01); *H04L 43/062* (2013.01); *H04L 41/5061* (2013.01); *H04L 43/0864* (2013.01); *H04L 43/0888* (2013.01); *H04L 41/5035* (2013.01); *H04L 43/0829* (2013.01); *H04L 43/106* (2013.01); *H04L 43/026* (2013.01); *H04L 41/5003* (2013.01); *H04L 43/028* (2013.01)
USPC .......................................... 370/252; 709/224

(58) Field of Classification Search
None
See application file for complete search history.

(56) References Cited

U.S. PATENT DOCUMENTS

| 4,769,811 | A | 9/1988 | Eckberg |
| 5,274,631 | A | 12/1993 | Bhardwaj |
| 5,282,194 | A | 1/1994 | Harley |
| 5,450,408 | A | 9/1995 | Phaal |
| 5,483,468 | A | 1/1996 | Chen |

(Continued)

FOREIGN PATENT DOCUMENTS

| CA | 2200412 | 11/1997 |
| CN | 1173085 A | 2/1998 |

(Continued)

OTHER PUBLICATIONS

Canadian Office Action dated Jun. 12, 2013, Application No. 2,351,175.
Office Action date Oct. 1, 2010 from the German Patent Office for German Patent Application No. 19983761.
Office Action from Australian Patent Office dated Sep. 13, 2006.
Office Action from Canadian Intellectual Property Office dated Nov. 1, 2007.

(Continued)

*Primary Examiner* — Hassan Phillips
*Assistant Examiner* — Duc Duong
(74) *Attorney, Agent, or Firm* — RatnerPrestia

(57) ABSTRACT

A method of monitoring data on a first communication line. Data is received from the first communication line (402) and a plurality of packets (406) are extracted (416) from the data. Statistics are then recursively generated (408), the statistics corresponding to the plurality of packets.

29 Claims, 28 Drawing Sheets

(56) References Cited

U.S. PATENT DOCUMENTS

| | | | |
|---|---|---|---|
| 5,521,907 A | 5/1996 | Ennis | |
| 5,570,346 A | 10/1996 | Shur | |
| 5,615,323 A | 3/1997 | Engle | |
| 5,684,957 A * | 11/1997 | Kondo et al. | 726/25 |
| 5,754,831 A | 5/1998 | Berman | |
| 5,761,191 A | 6/1998 | VanDervort | |
| 5,781,729 A | 7/1998 | Baker et al. | |
| 5,787,253 A * | 7/1998 | McCreery et al. | 709/231 |
| 5,790,605 A | 8/1998 | Helm | |
| 5,812,528 A | 9/1998 | VanDervort | |
| 5,850,386 A | 12/1998 | Anderson | |
| 5,850,388 A * | 12/1998 | Anderson et al. | 370/252 |
| 5,864,536 A | 1/1999 | Foglar | |
| 5,867,483 A | 2/1999 | Ennis | |
| 5,878,420 A | 3/1999 | de la Salle | |
| 5,886,643 A | 3/1999 | Diebboll | |
| 5,887,139 A * | 3/1999 | Madison et al. | 709/223 |
| 5,905,736 A | 5/1999 | Ronen | |
| 5,966,509 A | 10/1999 | Abe | |
| 5,974,237 A | 10/1999 | Shurmer | |
| 5,991,881 A | 11/1999 | Conklin | |
| 6,006,264 A | 12/1999 | Colby | |
| 6,070,190 A | 5/2000 | Reps | |
| 6,076,115 A | 6/2000 | Sambamurthy | |
| 6,085,243 A | 7/2000 | Fletcher | |
| 6,233,256 B1 | 5/2001 | Dieterich | |
| 6,243,756 B1 | 6/2001 | Whitmire | |
| 6,304,903 B1 | 10/2001 | Ward | |
| 6,321,264 B1 | 11/2001 | Fletcher | |
| 6,369,820 B1 * | 4/2002 | Bertram et al. | 345/440 |
| 6,578,077 B1 | 6/2003 | Rakoshitz | |
| 6,654,803 B1 | 11/2003 | Rochford | |
| 6,667,743 B2 * | 12/2003 | Bertram et al. | 345/440 |
| 6,819,655 B1 | 11/2004 | Gregson | |
| 7,039,015 B1 * | 5/2006 | Vallone et al. | 370/252 |

FOREIGN PATENT DOCUMENTS

| | | |
|---|---|---|
| EP | 0389689 A1 | 10/1990 |
| EP | 0544454 A2 | 6/1993 |
| EP | 0477448 B1 | 7/1995 |
| EP | 0522211 B1 | 1/1996 |
| GB | 2300789 A | 11/1996 |
| JP | 3212040 A | 9/1991 |
| JP | 5227218 A | 9/1993 |
| JP | 7321783 A | 12/1995 |
| JP | 9046391 A | 2/1997 |
| WO | WO-0101272 A2 | 1/2001 |

OTHER PUBLICATIONS

Office Action from Canadian Intellectual Property Office dated Oct. 11, 2006.
Office Action from Chinese Patent Office dated Jan. 26, 2007.
Office Action from Chinese Patent Office dated Aug. 17, 2007.
Office Action from European Patent Office dated Feb. 16, 2007.
Office Action from European Patent Office dated Apr. 11, 2006.
Office Action from Finland Intellectual Property Office dated Feb. 4, 2008.
Office Action from Finnish Patent Office dated Apr. 6, 2006.
Office Action from Israel Patent Office dated Nov. 11, 2007.
Office Action from Japan Intellectual Property Office dated May 7, 2008.
Office Action from Japan Intellectual Property Office dated May 13, 2008.
Office Action from Korean Intellectual Property Office dated May 23, 2006.
Office Action from Korean Intellectual Property Office dated Nov. 29, 2006.
Official Letter of Swedish Patent and Registration Office for Application 0501119-2 dated Jun. 14, 2010.
Examination Report for Application GB 0112566.5 dated Mar. 21, 2003.
Examination Report for Application GB 0112566.5 dated Nov. 10, 2003.
First Examination Report of Intellectual Property India for Application IN/PCT/2001/00504 dated Jan. 13, 2004.
First Office Action of Chinese Patent Office for Application 99813560.7 dated Mar. 26, 2004.
International Preliminary Examination Report for Application PCT/US99/27969 dated Jan. 15, 2001.
International Preliminary Examination Report for Application PCT/US01/15601 dated Dec. 30, 2002.
International Search Report for Application PCT/US01/15601 dated Aug. 29, 2001.
International Search Report for Application PCT/US99/27969 dated Apr. 5, 2000.
IP Australia—Examiner's First Report for Application 23487/00 dated Aug. 7, 2002.
IP Australia—Examiner's Report No. 2 for Application 23487/00 dated May 6, 2004.
Japanese Patent Office—Decision of Refusal dated Sep. 27, 2005.
Notification of Reason for Rejection of Japan Patent Office for Application 2000-584679 dated Mar. 23, 2004.
Notification of Reason for Rejection of Japan Patent Office for Application 2000-584679 dated Nov. 9, 2004.
Office Action of Canadian Intellectual Property Office for Application 2,351,175 dated Oct. 14, 2004.
Office Action of Finland National Board of Patents and Registration for Application 20011009 dated May 18, 2004.
Office Action of Swedish Patent and Registration Office for Application 0101745-8 dated Jun. 13, 2003.
Official Letter of Swedish Patent and Registration Office for Application 0501119-2 dated Jun. 22, 2005.
Second Examination Report of Intellectual Property India for Application IN/PCT/2001/00504 dated Dec. 20, 2004.
Second Office Action of Chinese Patent Office for Application 99813560.7 dated Nov. 12, 2004.
Second Office Action of Swedish Patent and Registration Office for Application 0101745-8 dated Apr. 28, 2004.
Supplementary European Search Report for Application No. 99967146.4 dated Aug. 16, 2005.
Supplementary Partial European Search Report for Application No. 99967146.4 dated May 13, 2005.
Asabe, Toshiya, "Operation Technology of Network", Interface CQ Publishing Co., vol. 19, No. 8 (Aug. 1993), 113-137.
Fukuda, Haruhiko, "An Internet QoS Visualizer", Information Processing Society of Japan, Research Report, vol. 96, No. 12 (1996), 73-78.
Jacobson, V., "TCP Extensions for High Performance", Network Working Group, Request for Comments No. 1323 (1992).
Kushida, Takayuki, "The Traffic Analysis on the Internet", Multimedia Communication and Dispersion Processing, 96-DPS-75-3 (Information Processing Society of Japan, (Feb. 29, 1996).
Oda, Yukari, "net@nt LAN Analyzer Software with Many Available Support Protocols", LAN Times, vol. 8, No. 2, (Feb. 1, 1998), 127-130.
Ogishi, Tomohiko, "Implementation of Performance Monitor for Internet and Examples of Its Analysis", IEICE Technical Report, SSE98-97 IN98-78 (the Institute of Electronics, Information and Communication Engineers, Sep. 25, 1998).
Onodera, Mitsuru, "LAN Analyzer for Monitoring PC LAN", Computer & Network LAN, vol. 8, No. 2, (Feb. 1, 1994), 47-51.
Remote LAN Monitor System, "MONSTRE", Computer and Network LAN, vol. 15, No. 8, (Aug. 1, 1997), 8-10.
Tanabe, Toshimasa, "Software for Analyzing LAN for PC, Different Applications, Differences in Operations", Nikkei Communications, vol. 155, (Aug. 2, 1995), 70-77.
Zhuni, Bao, "Congestion Control of Timestamping in Packet-Switched Network", Telecommunications Science, vol. 11, No. 2 (Feb. 1995), 38-41.
Canadian Office Action for CA 2,351,175 dated Mar. 10, 2014.

* cited by examiner

FIGURE 18

TCP Flows

| Start | Stop | Orig host | Orig port | Orig bytes | Term host | Term port | Term bytes | RTT (sec) | Response (sec) | Retransmit bytes |
|---|---|---|---|---|---|---|---|---|---|---|
| pkts plot Sep 3 09:01:04 1998 | Sep 3 09:02:43 1998 | 10.0.0.47 | 33392 | 89 | 10.0.0.5 | telnet | 12043 | N/A | N/A | 0 |
| pkts plot Sep 3 09:05:06 1998 | Sep 3 09:05:07 1998 | 10.0.0.47 | 33328 | 361 | 128.32.130.10 | http | 0 | N/A | N/A | 0 |
| pkts plot Sep 3 09:13:00 1998 | Sep 3 09:16:45 1998 | 10.0.0.47 | 33394 | 161 | 193.196.152.3 | fix | 1690 | 0.667519 | 0.601587 | 211 |
| pkts plot Sep 3 09:18:48 1998 | Sep 3 09:19:14 1998 | 10.0.0.47 | 33397 | 0 | 128.16.5.31 | 1337 | 560 | N/A | 5.638692 | 1 |
| pkts plot Sep 3 09:19:22 1998 | Sep 3 09:19:39 1998 | 10.0.0.47 | 33398 | 0 | 128.16.5.31 | kshmore | 697 | 0.429188 | 6.083521 | 2 |
| pkts plot Sep 3 09:19:59 1998 | Sep 3 09:22:40 1998 | 10.0.0.47 | 33399 | 990024 | 10.0.0.31 | gpwindows | 4584 | 0.001254 | 0.026585 | 0 |
| pkts plot Sep 3 09:23:58 1998 | Sep 3 09:24:00 1998 | 10.0.0.31 | ftp-data | 635 | 10.0.0.31 | 1818 | 0 | 0.000669 | N/A | 0 |
| pkts plot Sep 3 09:23:20 1998 | Sep 3 09:24:12 1998 | 10.0.0.47 | 1817 | 206 | 10.0.0.47 | ftp | 587 | 0.000836 | 0.044319 | 0 |
| pkts plot Sep 3 09:24:05 1998 | Sep 3 09:24:07 1998 | 10.0.0.47 | ftp-data | 31406 | 10.0.0.31 | 1819 | 0 | 0.000648 | N/A | 0 |

FIGURE 21

APPARATUS AND METHOD FOR COLLECTING AND ANALYZING COMMUNICATIONS DATA

CROSS REFERENCE TO RELATED APPLICATIONS

This application is a continuing application of U.S. Ser. No. 12/364,355 filed Feb. 2, 2009, which is a divisional application of U.S. Non-Provisional application Ser. No. 09/863,593, filed May 23, 2001, (now U.S. Pat. No. 7,492,720) which is the national phase of International Patent Application No. PCT/US99/27969, filed Nov. 23, 1999, which claims the benefit of priority under 35 U.S.C. §119 from U.S. Provisional Patent Application No. 60/109,718, filed Nov. 24, 1998, the contents of each being incorporated fully herein by reference.

TECHNICAL FIELD

The present invention relates generally to data communications, and, in particular, to a system and related method for collecting, analyzing, and monitoring data communications.

BACKGROUND OF THE INVENTION

It is now routine for data and other information to be communicated to different points via a communications or data network. One example of such data networks includes multiple end-user computers which communicate with each other along the various paths comprising such networks. The complexity of such computer networks can range from simple peer-to-peer connection among a relatively small number of machines, to LANS, WANS and, of course, the global computer network known as the Internet. The architecture of such networks varies widely, depending on the particular application, but most sophisticated networks make use of backbones, nodes, and computer servers supporting the transmission of data and information over such networks.

Companies and individuals are increasingly relying on such data networks not only for sending and receiving information, but for transacting business, and for any conceivable number of other activities involving the sending, receiving or viewing of information. The advent of the Internet and its continued development has only increased the demand for effective communication among companies, individuals, and other users of such networks.

This demand for sending and receiving data over such networks generates so-called "traffic", that is, a volume or "payload" of digitally-encoded information traversing appropriate paths on the network. Unfortunately, traffic across the network often leads to congestion or "trouble spots" at certain points or along certain paths of the network. Such congestion may take the form of maddeningly slow transmission of data, or, at worst, a complete inability to send or receive needed information over such network. This problem is compounded by the fact that, under certain network architectures, the traffic generally proceeds only as quickly as its slowest link or pathway will allow.

Obviously, such traffic congestion is undesirable for any number of reasons. Users "stuck" in such traffic may blame the congestion on their network service providers, causing such providers to potentially lose business. Such network delays will also have a negative effect, both directly and indirectly, on productivity of the networks users.

One approach to relieving such network congestion or other network "trouble spots" is to obtain timely and accurate information about the congestion or trouble spot. Unfortunately, attempts of the current art to unravel the intricacies of computer networks and relieve the congestion suffer from various drawbacks and disadvantages. For example, network monitoring tools of the current art may be difficult to customize, and thus may lack the necessary tools to analyze network congestion or trouble spots. Such network "sniffers" are often limited to performing traffic dumps of certain specific protocols which, again, may fail to accurately describe or pinpoint the source of network congestion. In other words, most network monitors and "sniffers" of the current art are limited in their abilities to tabulate real-time data, or to record data over extended periods of time.

Network monitors of the current art generally intrude into the network in order to evaluate or estimate network performance. The reference "TCP/IP Illustrated, Volume I—The Protocols," Chapters 7 and 8, available from Addison-Wesley Publishing Co., 1994, describes one such technique. To estimate round-trip times for "packets" of information in the Internet, the network monitor injects additional packets into the network and follows the travel of such additional packets. Thus, the very process of determining network performance itself further degrades performance by adding additional packets of information to the traffic.

Not only is the above-described method intrusive, but it is generally inaccurate as well. In particular, one-way times are evaluated by generally dividing the round-trip delay of the test packet by two; however, half of a round-trip time is generally not equivalent to a one-way delay, in part based on asymmetries (discussed below) in the network. To compensate for this inaccuracy, certain teachings of the current art inject test packets more frequently into the network, a solution which may further degrade the performance of the network which is being tested or monitored.

Network performance may be further enhanced if network traffic flow or network bandwidth dimensioning could be more accurately modeled. In particular, traffic does not necessarily flow symmetrically across a given network path. This is especially true when the path terminates in an end user on an internet connection. Such a path is asymmetric in that the end-user normally downloads more payload or traffic than he or she uploads. Network monitors of the current art generally do not detect or model such asymmetries, with the result that greater network resources are devoted to particular routes than may otherwise be required. This costs additional money and wastes computer resources.

There is thus a need to improve network performance and relieve network traffic congestion. There is a further need for tools which do not intrude upon the traffic flow, which can be adapted to analyze different traffic parameters or types of "packets," and which collect and tabulate required statistics quickly and accurately.

With the increasing use of computer data networks, companies and individuals are increasingly interested in collecting, filtering, or "profiling" data about the users or their traffic on such networks. Marketing enterprises or other sales organizations may be particularly fascinated by demographic or other data which can be gleaned by accurate recording and analysis of network traffic. Unfortunately, many Internet advertisers obtain customer profiles by requiring the users to fill out forms and questionnaires. Advertisers miss out on most of this customer information because customers often do not want to be bothered with answering such questions. There is thus a need to obtain customer "profiles" in a less intrusive manner.

The expanding use of networks has likewise expanded the possibilities of "hackers" or other damaging intruders performing mischief or even criminal activities in proprietary or protected networks. As such, a system which can determine the origin of security breaches would be valuable to enforcement agencies, such as the FBI, to stem the tide of computer-related crimes and misdemeanors. The current art, again, generally fails to analyze, tabulate, monitor, or record the flow of data over a network in an optimal way to facilitate security activities.

Companies or individuals charged with monitoring networks not only need to obtain vast amounts of information and statistics in a timely manner, but they also need to view such data quickly, easily, and in an understandable format. Again, current art solutions are often limited to providing "dumps", often chronologically, with inadequate statistical compilations or graphical representations of such data. It is thus desirable not only to compile network traffic information, but to perform certain commonly needed calculations, and to graphically represent such calculations in a user-friendly and flexible format.

To overcome the shortcomings of conventional data communication monitoring methods and systems, a new method of monitoring a communication line is provided. An object of the present invention is to provide a network monitor for collecting and analyzing communication data. Another object is to provide a method for collecting and analyzing communication data.

SUMMARY OF THE INVENTION

To achieve these and other objects, and in view of its purposes, the present invention provides a method for monitoring data on a first communication line. Data is received from the first communication line and a plurality of packets are extracted from the data. Statistics are then recursively generated, the statistics corresponding to the plurality of packets.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIGS. 10-28 are screen displays illustrating a user interface for receiving monitoring parameters and illustrating methods of displaying and providing communication analysis information.

DETAILED DESCRIPTION OF THE INVENTION

PCT International Patent Application No. PCT/US99/27969, filed Nov. 23, 1999, and U.S. Provisional Patent Application Ser. No. 60/109,718, filed Nov. 24, 1998, are incorporated by reference herein in their entireties as though fully set forth herein.

Figure 1:
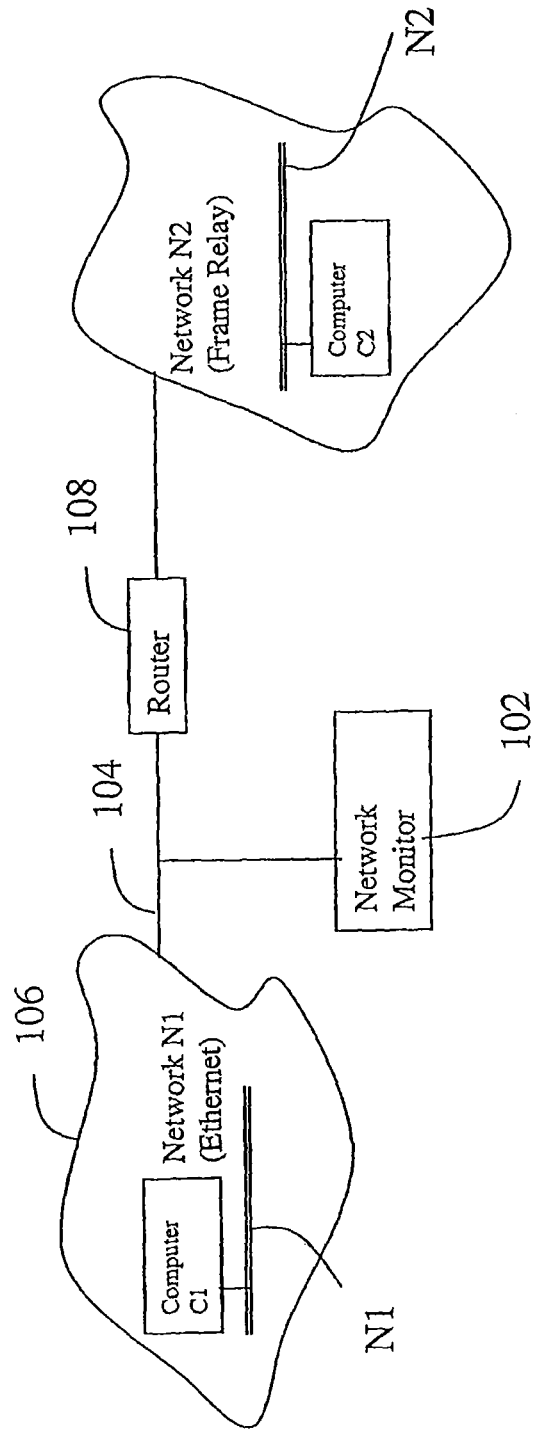
FIG. 1 shows a network monitor according to the present invention coupled to a communication line.

Referring now to the drawing, in which like reference numerals refer to like elements throughout, FIG. 1 illustrates an exemplary network monitor 102 according to the present invention which is coupled to an exemplary network N1 106 via a first communication line 104. The network monitor 102 receives (monitors) data communications (traffic) on communication line 104 and provides real-time metrics or statistics of the data traffic on the communication line 104.

Figure 2:
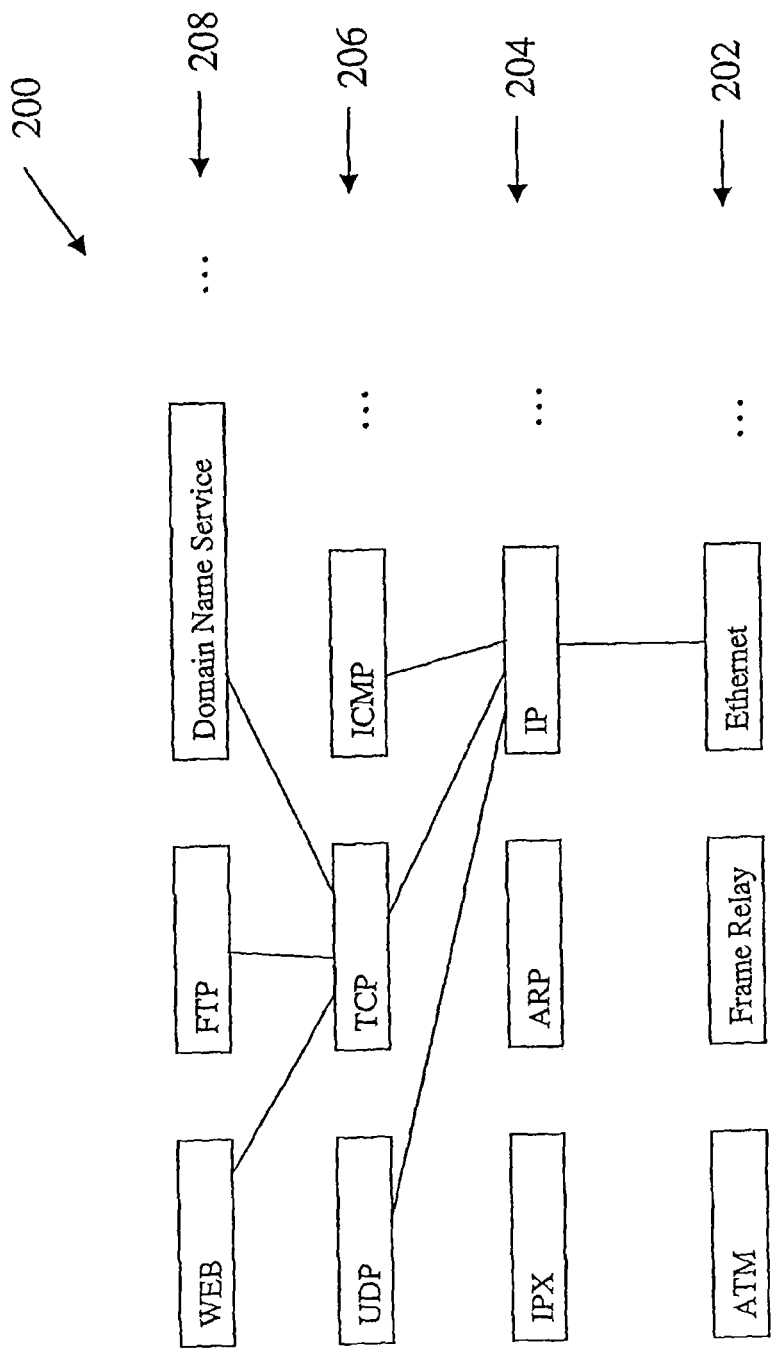
FIG. 2 illustrates an exemplary protocol hierarchy.

The communication line 104 may use a single data link layer protocol to transport traffic of a multitude of different higher hierarchical protocol layer protocols. One such hierarchical protocol structure 200 is illustrated in FIG. 2. The data link layer protocol 202, Ethernet in this exemplary case, of traffic between the network N1 106 and the router 108 may include encapsulated IPX, IP, ARP, or other network layer 204 traffic. The IP traffic may include encapsulated UDP, TCP, ICMP or other transport layer 206 traffic. The TCP traffic may include encapsulated Web, FTP, Domain Name Service, or other application layer 208 traffic.

The network monitor 102 according to the present invention includes hardware and software (discussed below) which collects and analyzes network traffic in such a way that it can generate a variety of real-time statistics on such traffic at one or multiple protocol layers. The real-time statistics generated by network monitor 102 enable quality and quantity of service analysis, billing based on quality of service and quantity of service, dynamic network resource allocation and planning, customer profiling based on data content, network security analysis, and session playback. Exemplary statistics include byte counts, bit counts, one-way or roundtrip delays, response times, retransmitted bytes, originating bytes per host, terminating bytes per host, originating-terminating host pair counts, web abort rates, throughput, goodput, and percent retransmitted bytes due to delays or losses. These statistics may selectively be provided based on traffic on the first communication line 104 on one or multiple protocol layers between the data link layer and the application layer.

Figure 3:
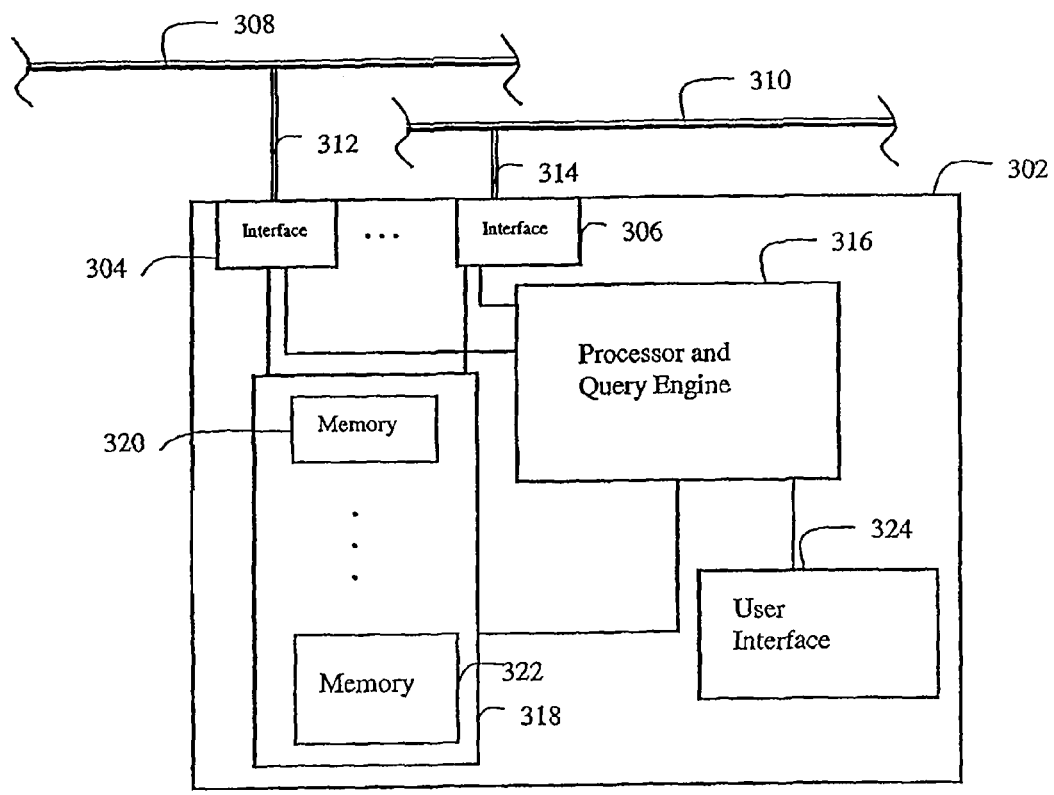
FIG. 3 is a block diagram of an exemplary network monitor according to the present invention.

Operation of an exemplary network monitor 302 shown in FIG. 3 is described with reference to the flow chart in FIG. 4. The network monitor 302 includes a first network interface 304 coupled to a first communication line 308 by a first connection 312 and a second network interface 306 coupled to a second communication line 310 by a second connection 314. The first interface 304 receives first data (a bitstream) from the first communication line 308 (step 402) and the bitstream is then segregated into packets (step 404). The term segregate is used herein to mean that previously defined packets are being extracted from the bitstream. The bitstream may be segregated into packets by either the interface 304 or by the host computer 316. The packets are stored in memory 318 which is hierarchical in this embodiment and includes a short-term memory 320 and at least one longer-term memory 322. A processor and query engine 316, optionally controlled by a user interface 324, then processes the packets as described below with reference to FIG. 4.

In an exemplary embodiment, the network monitor 302 is coupled to the first communication line 308 in a non-intrusive manner. That is, it does not directly hinder the flow of traffic on the communication line. The network monitor 302 may be coupled to the communication line 308, for example, by plugging the first connection 312 into a port or jack on a switch or router, by breaking the communication line 308 and installing a Y-connector to which the first connection 312 is coupled, by connecting the first connection to a hub, using an optical splitter, or by connecting the network monitor 302 to a monitoring jack in a central office.

Processor and query engine 316 converts the packets into records and stores the records in memory (steps 414-422). Processor and query engine 316 includes suitable programming to generate statistics corresponding to the packets (steps 406-412). Although the generation of statistics for the packets may be accomplished in a variety of ways, one preferred approach processes a set of packets received over a predetermined timer interval or "sampling time" (step 406) to generate corresponding statistics (step 408). The processing is then repeated in a recursive fashion to successive sets of packets received during successive time periods (step 410). During such processing, suitable programming stores the generated statistics in memory at appropriate intervals of time, such intervals preferably on the same order as the time intervals corresponding to the sets of packets.

The conversion of the packets into records permits a wide variety of further statistics to be generated as now described. The records are generated by first determining the type of each packet (step 414) and then filtering the packets (step 416) based on their determined types. An index is generated (step 418) for each packet and the packet is then converted into an indexed record (step 420) and stored in memory (step 422). Further statistics are then generated (step 426) using the statistics previously generated for the packets and records are then provided to one or more applications such as a display device (step 428), a router for dynamically adjusting network routing based on the further statistics (step 430), and a billing service for billing clients based on quality or quantity of service as determined based on the generated statistics (step 432).

Figure 4:
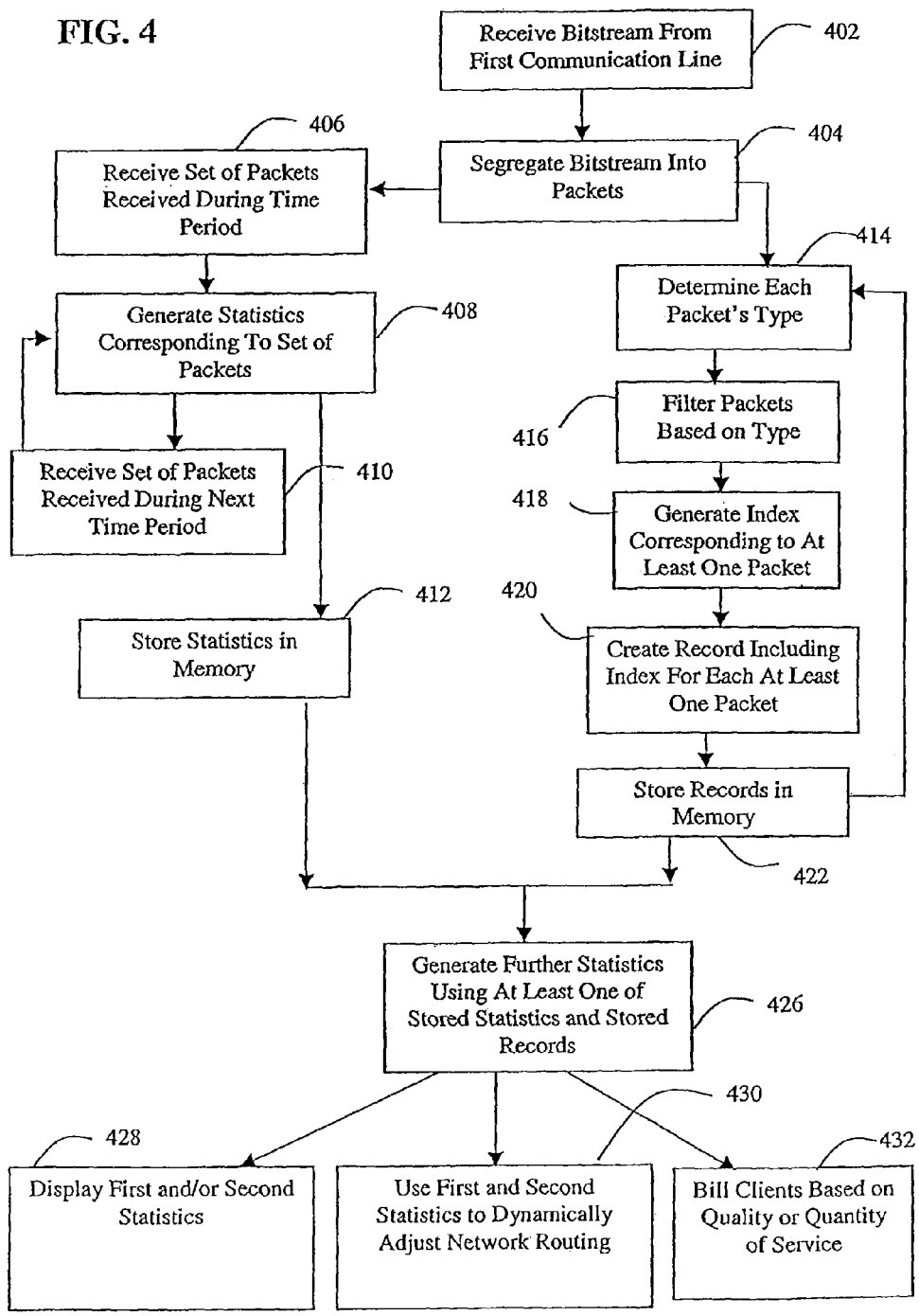
FIG. 4 is a flow chart illustrating an exemplary method of monitoring a communication line according to the present invention.

Application of the process of FIG. 4 is now described for an Ethernet communication line including encapsulated IP packets which encapsulate TCP packets which encapsulate web traffic (See FIG. 2). The Ethernet bitstream is received from the communication line (step 402) and is segregated into packets (step 404). The packets are divided into sets, each set including packets received during one of successive one-second time periods (exemplary time period) (step 406). The number of bits received during each one-second time period (exemplary statistic) is calculated (step 408). Successive statistics are generated for successive time periods by receiving the next set of packets corresponding to the next one-second time period (step 412) and then calculating the number of bits in those packets (step 408). The bit counts for each one-second time interval are stored in memory (step 412) as they are generated.

A type (e.g. IP, ARP, . . . ) of each packet is determined (step 414). If a user only wishes to analyze traffic of IP packets, the packets are filtered to pass only the IP packets (step 416). The time when the network monitor received each IP packet is used as an index for the each respective IP packet (418). An indexed record is then generated (step 420) for each IP packet and is stored in memory (step 422). An exemplary record having the index as a first field F1 and the packet as a second field F2 is illustrated below.

| F1: Index (time of receipt) | F2: Packet or portion of packet |

In addition to the filtering (step 416) only passing IP packets, the filter may also be used to pass only a portion of the packet, such as only the IP portion, by truncating the Ethernet overhead portion so the record above contains only the IP portion in the second field F2. Alternatively, the record may include a plurality of fields, each corresponding to a portion of the IP packet such as a source address or destination address, and filtering may be performed based on any one or more of the plurality of fields.

Any number of statistics can be generated from the stored records alone, or in combination with statistics for the packets generated in steps 406-412. In this example, a further statistic known to the art of interest includes the ratio of the number of bits in IP packets received to the number of bits in all packets received for each successive minute (step 426). The calculation of this statistic is facilitated according to the present invention, because the stored packets are already all IP packets and are indexed by time of receipt. As such, the calculation is performed by sorting the records by index, reading the set of records for each successive minute, and adding the number of bits in each set of records. The number of bits in all packets per minute may be calculated by summing the previously calculated bit counts generated on a per second basis in groups of sixty (thereby equaling one minute). Thus, the further statistic is generated using both the stored records and the stored statistics, which reduces the number of additional calculations needed and the time to generate such further statistic.

A specific example of the filtering and storing methods performed by a network monitor according to the present invention was described above with regard to FIG. 4. The flexibility of data collection and analysis methods of a network monitor 500 according to the present invention are described below with regard to the data flow diagram of FIG. 5.

An incoming bitstream is packetized by a packetizer 502. Decoding of the bitstream may be automatically performed for known protocols or may be performed according to user-specified parameters for custom or proprietary protocols. For example, if a new data link layer protocol is introduced, network monitor 500 includes suitable programming to respond to user-defined protocols, entered using the user interface 520. The inventive network monitor 500 thus recognizes packet structures of the new protocol to packetize an incoming bitstream. The network monitor could then perform its data collection and analysis methods through the higher protocol layers. This flexibility is not limited to the data link layer. In other words, the network monitor 500 according to the present invention is able to collect and analyze data communications for custom protocols at other protocol layers.

The packets may be directly stored into the short-term memory 510 using path A. This is useful for storing all data received from the communication line. The short-term memory 508 may periodically transfer data to a long-term memory 510 to prevent overflow. Although illustrated as having only a single short-term memory 508 and a single long-term memory 510, the teachings of the present invention are applicable to other hierarchical memory structures including a plurality of memory devices. For example, the memory may include a random access memory (RAM), a disk memory, and a tape memory. As the RAM fills, data is transferred to the disk memory. As the disk memory fills, data is transferred to the tape memory. As the tape memory fills, tapes are replaced for continuous or long-term data storage for archival purposes, for example. As indicated by the double arrow to the short-term memory 508 and between the memories 508, 510, data stored in the memories may later be retrieved for analysis or for one of the applications 522-530 discussed below.

Storing all packets directly into memory may be desired for security applications 528. For example, the network monitor may be programmed to store all communications for a period of 1 week and then overwrite the oldest stored data. If a breach in security is detected within a week of its occurrence, the stored data may be analyzed by the network monitor to determine the source and extent of the breach.

The packetized data may alternatively be provided by the packetizer 502 to the index generator 504. The index generator 504 generates an index corresponding to one or more of the received packets. Examples of an index corresponding to a packet include a time stamp to indicate the time it was received by the network monitor, the type of packet (protocol and/or layer), the size of packet, a packet number (1, 2, 3, . . . ), an interface number, an application, and an associated session. Record generator 506 receives the packets and the generated index and generates a record including the generated index. Alternatively, the record generator 506 may combine the received packet and index with an existing record previously stored in memory 508, 510. The record generator may also receive a packet directly via path C and generate an unindexed record including the packet or may combine the packet into an existing record previously stored in memory 508, 510.

For example, a single record may be generated corresponding to an ATM session. When a first cell (a fixed size packet) corresponding to the ATM session is received, it may be indexed and an indexed record may be generated and stored in the memory 508, 510. The index may be an identifier of the ATM session, for example. When further cells corresponding to the ATM session are received, not necessarily in order, the record generator 506 may directly receive these cells via path C, read the previously stored indexed record from memory 508, 510, and then combine the newly received cell into the indexed record. In addition to simply combining packets belonging to a common ATM session in a common record, the record generator 506 may also orient the received ATM cells within the record in their correct order.

The record/packet type identifier 512 receives packets or records from either the record generator 506 or from the memory 508 and then characterizes the received packets or records by identifying its corresponding "type" or "property". The type or property of a packet or record is a versatile identifier and may be programmed via the user interface 520. Examples of packet or record types or properties include the number of corresponding bits or bytes, its protocol layer, its protocol type at a particular protocol layer, a source address, a destination address, an end-user ID, and an application ID. The records or packets are then filtered in the packet type filter 516 based on the property or type identified by the record/packet type identifier 512. The filtered records or packets are then indexed, indexed and turned into records, or directly stored into memory 508, 510.

The time period filter 514 receives records or packets from the record generator or the memory 508, 510, and filters them based on the time they were received from the communication line by the network monitor. The records or packets are then segregated into groups corresponding to packets received by the network monitor during respective successive time periods. The statistic generator 518 then generates statistics for each of the successive time periods corresponding to packets received during each respective successive time period.

Figure 5:
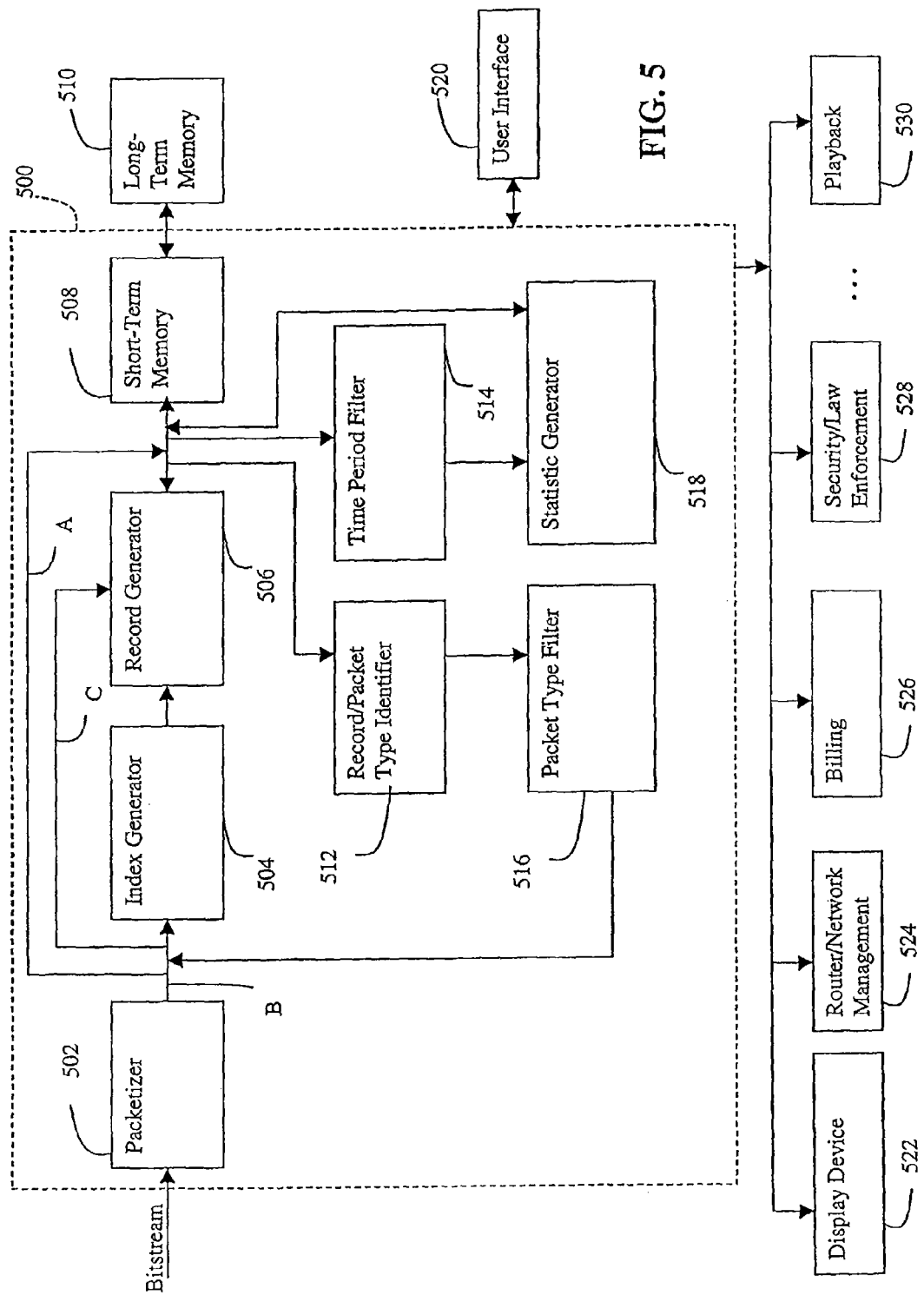
FIG. 5 is a data flow diagram illustrating the many permutations of data collection and analysis methods of a network monitor according to the present invention.

The filtered packets and the generated statistics may be stored in memory. The paths between the functional blocks in FIG. 5 illustrate that the contents of memory, may then again be used to perform further filtering or statistic generation. Thus, a network monitor according to the present invention may recursively collect and analyze data by generating statistics based on previously generated statistics or stored packets.

In addition to programming the network monitor for a custom protocol as described above, the user interface 520 may also define the operating parameters of the functional blocks within the network monitor. For example, a user may specify the index to be used by the index generator 504, the time period to be used by the time period filter 514, and the statistics to be generated by the statistic generator 518 for each of the successive time periods.

The collected data and the corresponding analysis generated by the network monitor 500 may be provided to one or more applications 522-530. For example, a display device 522 may display statistics, records or packets responsive to user selection as further described below with regard to the display screens in FIGS. 10-28.

The statistics generated by the network monitor 500 may be provided to a network administrator or router 524 to allow for dynamic routing of communications and network bandwidth management, also known as "yield management", on a network responsive to statistics corresponding to network performance. It is readily appreciated that, by measuring one-way delays and by providing traffic statistics on a protocol-by-protocol basis at different protocol layers, a network monitor according to the present invention can identify these asymmetries by quantifying traffic flows to allow a network administrator to properly size network resources according to the measured flows.

Communication networks can be optimized at the service layer because the network monitor according to the present invention includes suitable programming to analyze traffic flows at any protocol layer. Although different services may have different service requirements, these services are often integrated in a single communication network. Nonetheless, services such as real-time multimedia, voice over IP, data, and Intranet may each have unique network service requirements. For example, for voice over IP, due to low tolerances in voice transmissions degradation, a lower quality of service including delay or loss of data may not be tolerated. In contrast, data transmission can proceed in a lossy environment due to error recovery by retransmission. An exemplary router 524 is configured to route traffic corresponding to different services differently depending on their service requirements.

The network monitor according to the present invention includes programmed features which identify flows corresponding to each individual service and/or user and provide for analysis of interactions with different services. This information may be used by a router, for example, to make real-time or non-real-time decisions on optimizing network topologies, routes, or service segregation, etc. to achieve an optimal configuration suitable for providing each and every service with its own unique quality of service requirement.

A billing system 526 may be configured to receive quality and/or quantity of service statistics corresponding to different services and different hosts and bill clients accordingly. This allows clients to be billed based on these statistics rather than providing flat rate billing for previously unmeasured service. For example, a client may use her unlimited Internet service for voice over IP communication. According to the present invention, the network monitor 500 may generate statistics for a particular client on the number, duration, and destination of voice over IP calls. The statistics are then converted to billing information by the billing system 526 and the client is billed accordingly. Thus, an Internet subscriber that uses the Internet for voice over IP calls, may now be billed according to the quantity, duration, and destination of calls as is done for non-Internet telephone service. Clients may similarly be billed based on a number of e-commerce transactions, a number of stock trades, a number of requests for real-time stock quotes, and other transactions. Alternatively, clients may have service contracts including different billing rates depending on a quality of service provided and may be billed accordingly. A network monitor may also be used to ensure compliance with service contracts which guarantee minimum service standards or service level agreements.

As described above, the collected data may be used for security 528 to identify breaches in security, to identify improper network use or illegal activity. For example, packets may be filtered to identify particular files which have been FTP'd to a server, to identify who telnetted (logged onto) a particular machine or server, and to see what they typed once logged on.

Statistics from a network monitor may be correspond to a user or a group of users for profiling the user or group. Much Internet advertising is directed to customers based on a customer profile generated by asking a user to answer a few questions. A network monitor according to the present invention can filter each received packet based on its contents to build individual customer profiles. For example, a node which monitors the Philadelphia customer base may look at every packet from every user before it enters the Internet. Also, the returned traffic to these users can be analyzed by looking (filtering) for specific text within the packets or for the web sites visited by the user. A profile per user or group of users may then be generated based on the filtered data to target content to the user which will be of interest to the user such as targeted email. The method described above for filtering may similarly be used by law enforcement or security officials to monitor communications to detect unlawful activity or to monitor activity of selected users.

The network monitor may also be used to provide data to a playback device 530 to playback client sessions which were monitored from the communications line. All received packets may be recorded and then filtered based on a particular session. The session may be identified based on information included in the packets themselves or based on session information received in special packets or channels such as SDR (session directory protocol). The packets corresponding to the session may then be played back in a fashion originally presented to the user. This method may be used to replay all web activity of a user or of voice over IP conversations.

The network monitor may be configured by a user to monitor communication lines that transport traffic using a proprietary or custom protocol. Along with a suitable physical layer interface between the network monitor and the communication line, a user may enter proprietary protocol parameters using the user interface. The parameters define the structure of packets within the bitstream transported on the communication line for the network monitor to segregate the packets from the bitstream. Additional parameters may also define fields within a packet so the network monitor could be configured with custom queries to provide statistics based on the content of these packet fields. The network monitor may similarly be programmed to receive and analyze data corresponding to custom protocols at layers higher than the link layer.

In an exemplary network, the data transmission protocol provides for each packet to include a time stamp field. Packets transmitted from a source to a destination include a time stamp value in the time stamp field indicating a time of transmission by the source. When the packet is received at the destination, the destination can compute the one-way transmission duration or delay from the source to the destination by subtracting the time stamp value from a current time value. This protocol allows for simpler one-way transmission delay and quality of service measurements by eliminating the need for communication between network monitors to match packet pairs at separate network monitors.

For a network including many separate intermediate transmission paths between the source and the destination, the one-way end-to-end transmission duration information does not provide information regarding a particular bottleneck somewhere between the source and destination. For improved bottleneck diagnosis, rather than only calculate end-to-end delays, a network monitor according to the present invention can be coupled to one of the intermediate separate transmission paths between the source and destination. The network monitor can receive the time stamp value from a packet traversing the network from the source to the destination. The time stamp value may be subtracted to the current time at time of receipt of the packet by the network monitor to determine an intermediate duration value. One or more intermediately spaced monitors may be used as described above to locate the bottleneck in a network. In an exemplary embodiment each of the source, destination, and network monitor include a GPS (global positioning satellite) interface for receiving the current time used to calculate the transmission duration.

Figure 6:
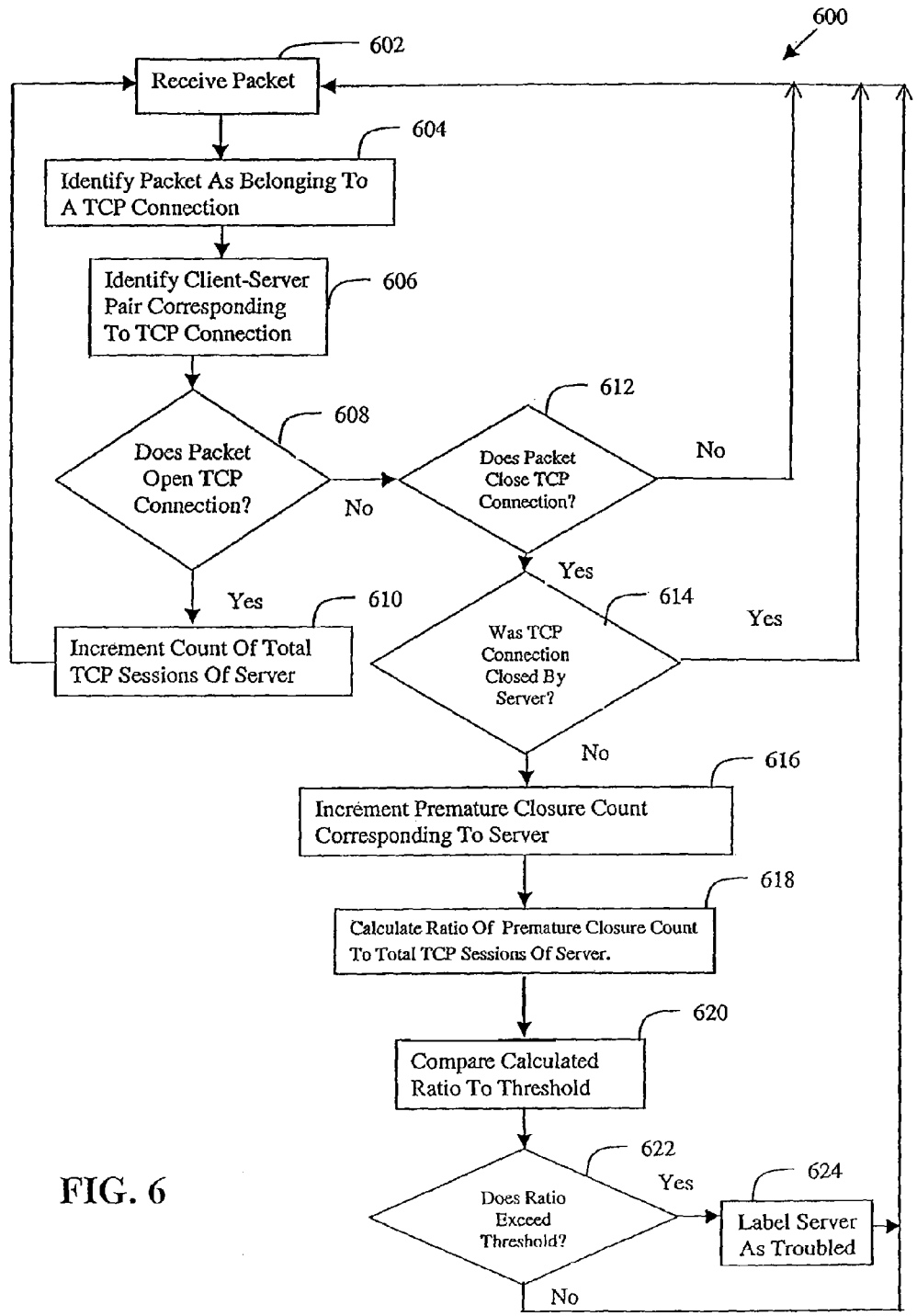
FIG. 6 is a flow chart illustrating a method for identifying troubled servers.

One of the metrics that a network monitor according to the present invention can provide is an indication of the number of aborted connections for a particular source-destination pair, for a particular source or destination, and information on the ratio of aborted connections to total connections for a particular source or destination. An exemplary method of identifying troubled TCP (transmission control protocol) servers is described with regard to the flow chart 600 in FIG. 6.

As known to those skilled in the art, a TCP session is normally opened by the client and is then closed by the server when it has no more data to send to the client. If a TCP session is closed by the client, this indicates that the session is being terminated prematurely. Using the web as an example, a client (user using browser) may close the session for reasons including simply changing one's mind regarding the need for the desired data or due to impatience due to delay in receiving desired data.

The network monitor receives a packet from a communication line (step 602) and identifies whether the packet belongs to a TCP session (step 604). The network monitor may identify whether the packet is a TCP packet by identifying and decoding a protocol field in the packet which identifies which of several transport layer protocols the packet belongs to. Once a packet is identified as TCP, the TCP client and TCP server are identified (step 606). The packet is then examined to determine whether it opens or is initiating the TCP connection (step 608). If the packet is the opening or initiating packet of a TCP session, a count of the total number of TCP sessions for the previously identified (in step 606) TCP server is incremented (step 610).

If the packet is not an opening packet, the network monitor next determines whether the packet is closing the TCP connection (step 612). If not, the network monitor gets the next packet (step 602). Otherwise, the network monitor determines (step 614) whether the connection is being closed by the server, by examining the FIN bit for example, or whether the connection is being closed by the client. Closure by the server indicates normal termination of the session and the network monitor gets the next packet (step 602). Closure by other than the server indicated premature termination of the session and a premature closure count corresponding to the particular server is incremented (step 616). The ratio of premature closures to the total TCP sessions of the particular server is calculated (step 620) and compared to a predetermined threshold value (step 622). If the ratio of premature closures exceeds the threshold, the particular server is identified as a "troubled server" (step 624).

As known to those skilled in the art, in some networks all packets corresponding to a particular TCP session may not travel through the same communication line and therefore may not be detected by a single network monitor interface. A network monitor can be placed in proximity to or on a server or client to "catch" all packets. Alternatively, multiple network monitor interfaces may be used as described above to store records corresponding to packets. The stored records may then be analyzed to determine which servers may be "troubled". In an exemplary embodiment, remote network monitors each look for FIN packets, using a filter, for example, and upon detecting a FIN packet they send a message including the contents of the FIN packet to a central monitor that makes the "troubled server" determination.

Although the teachings regarding measuring aborted connections and identifying troubled servers are described above with regard to TCP sessions, these teachings are generally applicable to other protocols and to other protocol layers and are not limited to identifying troubled TCP servers. For example, in another protocol, a session may be both opened and closed by the same node, whether it be the client or the server. In addition, the session payloads may be transmitted in separate packets from or on separate communication links from the session control messages.

Figure 7:
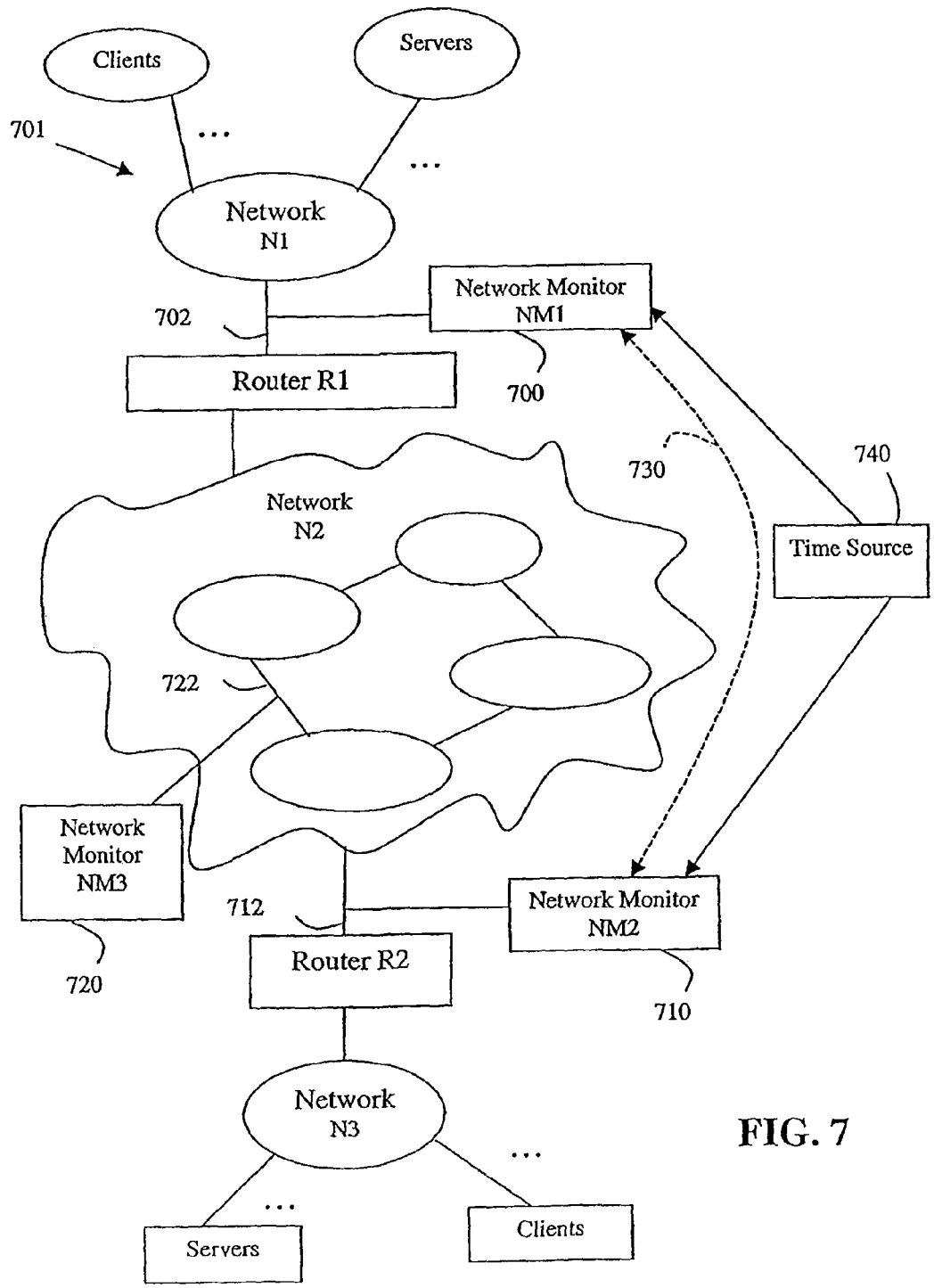
FIG. 7 shows a network using network monitors according to the present invention coupled to two separate communication lines in a network.

In a further alternative embodiment shown in FIG. 7, a system 701 for monitoring communications according to the present invention may include one or more network monitors each coupled to respective communication lines in a network as shown in FIG. 7. First, second, and third network monitor 700, 710, 720 are coupled to the first, second, and third communication lines 702, 712, 722, respectively. Each network monitor 700, 710, 720 collects and analyzes data received from its respective communications line as described above with regard to the data flow diagram in FIG. 5.

In addition to providing independent data collection and analysis, a system including a plurality of network monitors 700, 710, 730 may correlate data received at the different network monitors to provide improved network performance analysis. For example, one-way delay may be calculated for data traveling from the first communication line 702 to the second communication line 712.

Figure 8:
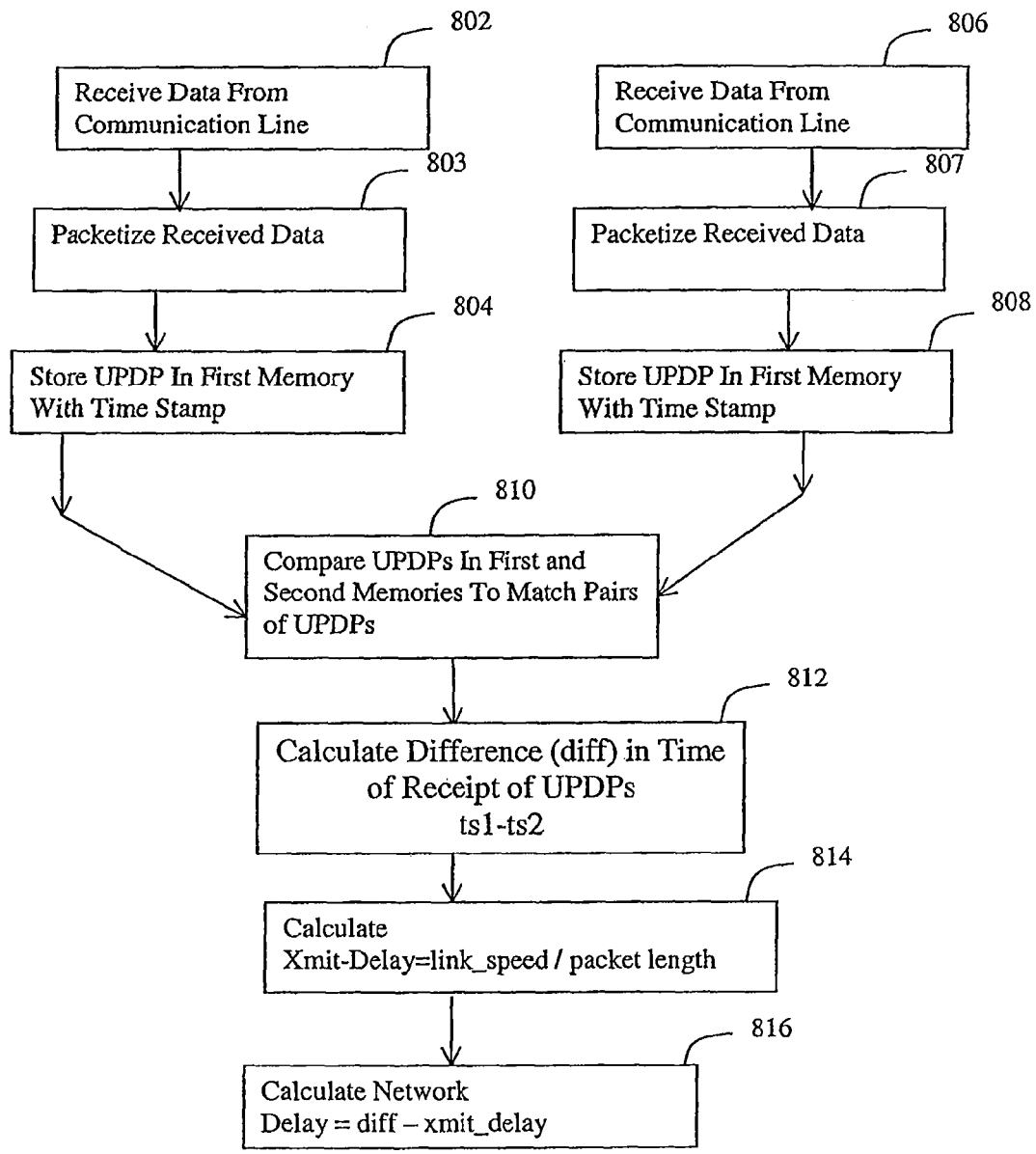
FIG. 8 is a flow chart illustrating a method for determining transmission delay.

An exemplary method of calculating the one-way delay is illustrated by the flow chart in FIG. 8. Generally, the "same" packet is identified at two separate network monitors and the difference in time between when it was received by each monitor is used to calculate the one-way delay. The "same" packet is identified by zeroing out portions of the packet that change between the separate network monitors.

Each of the first and second network monitors 700, 710 receives data (step 802, 806) from its respective communication line 702, 712. The packetizer 502 segregates the received data into packets (steps 803, 807) and each the index generator (504) associates the time of receipt (time stamp) of each packet with each packet. The record generator 506 generates a record including the time stamp of corresponding to each packet and a unique portion of the data packet (UDPD) and stores the record in memory 508, 510 (steps 804, 808).

The UPDP is a portion of the received packet that makes the data unit uniquely identifiable. For example, for an Ethernet communications line and an IP payload, the Ethernet header is removed from the packet, the IP ttl and checksum fields are zeroed, and the IP header and the 20 succeeding bytes are saved and incorporated by the record generator 506 into a UPDP record. The UPDP may be different for different protocols and may be programmed using the user interface.

The UPDP records of the first network monitor 700 are compared to the UPDP records of the second network monitor 710 to match pairs of UPDPs (step 810)).

The first and second network monitors may communicate via a communication link 730. The communication link 730 may be implemented by communication of the network monitors through the network they are monitoring (in-band). Alternatively, the communication link 730 may be implemented by communication external to the network over a telephone line, a radio connection, or a satellite connection, for example (out-of-band).

For each matched pair of UPDPs, the corresponding time stamp ts2 from the second network monitor is subtracted from the corresponding time stamp ts 1 from the first network monitor (step 812). This time difference ts1–ts2 represents the duration for the data corresponding to the UPDP to travel from the second network monitor 710 to the first network monitor 700. By calculating the UPDP, the transmission duration of a certain payload between first and second communication lines 702, 712 using the same or different communication protocols may be determined according to the method described above.

In an exemplary embodiment, the time difference ts1–ts2 is normalized (steps 814, 816) to account for the delay of the first communication line 702. The delay is normalized by subtracting the delay xmit-delay for the packet corresponding to the UPDP to traverse the first communication line from the time difference as illustrated by the equation below:

$$\text{Normalized Network Delay} = (ts1 - ts2) - (\text{link\_speed}/\text{packet\_length})$$

where link_speed is the transmission rate on the first communication line 712, and packet_length is the length of the packet on the first communication line which contained the UPDP. The calculated network delay may include components due to queuing delay and to transmission delay. As illustrated by the data flow diagram in FIG. 5, the statistic generator 518 can receive the packet for which is UPDP record is to be generated, the statistic generator 518 calculates the number of bits in the packet and provide this statistic to the record generator for incorporation into the UPDP record for use in a normalization calculation. Round-trip times may be estimated by similarly calculating the delay from the first to the second network monitor and adding this delay to the delay between from the second to the first network monitor.

The accuracy of the calculated transmission delay depends on the synchronization of the time clocks of the first and second network monitors 700, 710. The network monitors may communicate via communication line 730 to synchronize their respective clocks. In an exemplary embodiment, the network monitors are synchronized by receiving a time signal from a common time source 740. In an exemplary embodiment, the transmission delay is generated at a level of accuracy less than 10 microseconds, that is, the difference between the calculated delay and the actual delay is less than 10 microseconds. In a preferred embodiment, the common time source 740 is a system of global satellites such as the global positional satellites (GPS) and each network monitor 700, 710 includes a receiver for receiving a time signal from one or more global satellites. When the two communication lines to be monitored are proximate to each other, one of the first and second network monitors 700, 710 may include a master GPS receiver and the other may include a slave GPS receiver coupled to the master.

An exemplary network monitor is implemented with a host computer having an interface computer on a network interface card (NIC) coupled to the communication line it is monitoring. As described above, data received by the NIC may be processed before being sent to the host computer. Also as described above, the network monitor may use the time of receipt of data from the communication line for generating network communication statistics or metrics. In order to accurately record the time when data is received from the communication line, the interface computer associates a time of receipt with the data (time stamps the data). By having the interface computer rather than the host computer time stamp the data, inaccuracies in the time of receipt due to a delay in transferring data from the interface computer to the host computer are reduced or eliminated.

In an exemplary embodiment, the interface computer includes an interface clock and the host computer has a host clock. The host clock and the interface clock are synchronized so the host computer can use the time stamp to accurately generate statistics corresponding to the received data. In an exemplary embodiment, the interface clock is implemented as a counter. As each packet is received from the communications line, the current value of the counter is associated with that packet. The packet is later transferred to the host computer with the counter value. The host computer includes a host clock synchronized with an absolute time reference. As described above, the absolute time reference may be provided by a global positioning satellite.

The host clock and the interface clock are synchronized by correlating the counter values associated with each packet by the interface computer with the absolute time reference. The method of synchronizing the interface clock with the host clock is described with reference to the flow charts in FIGS. 9A and 9B with regard to the host computer and the interface computer, respectively. Generally, the host computer periodically requests the value of the interface clock counter from the interface computer and uses this value to correlate the counter to the host clock.

Figures 9A, 9B:
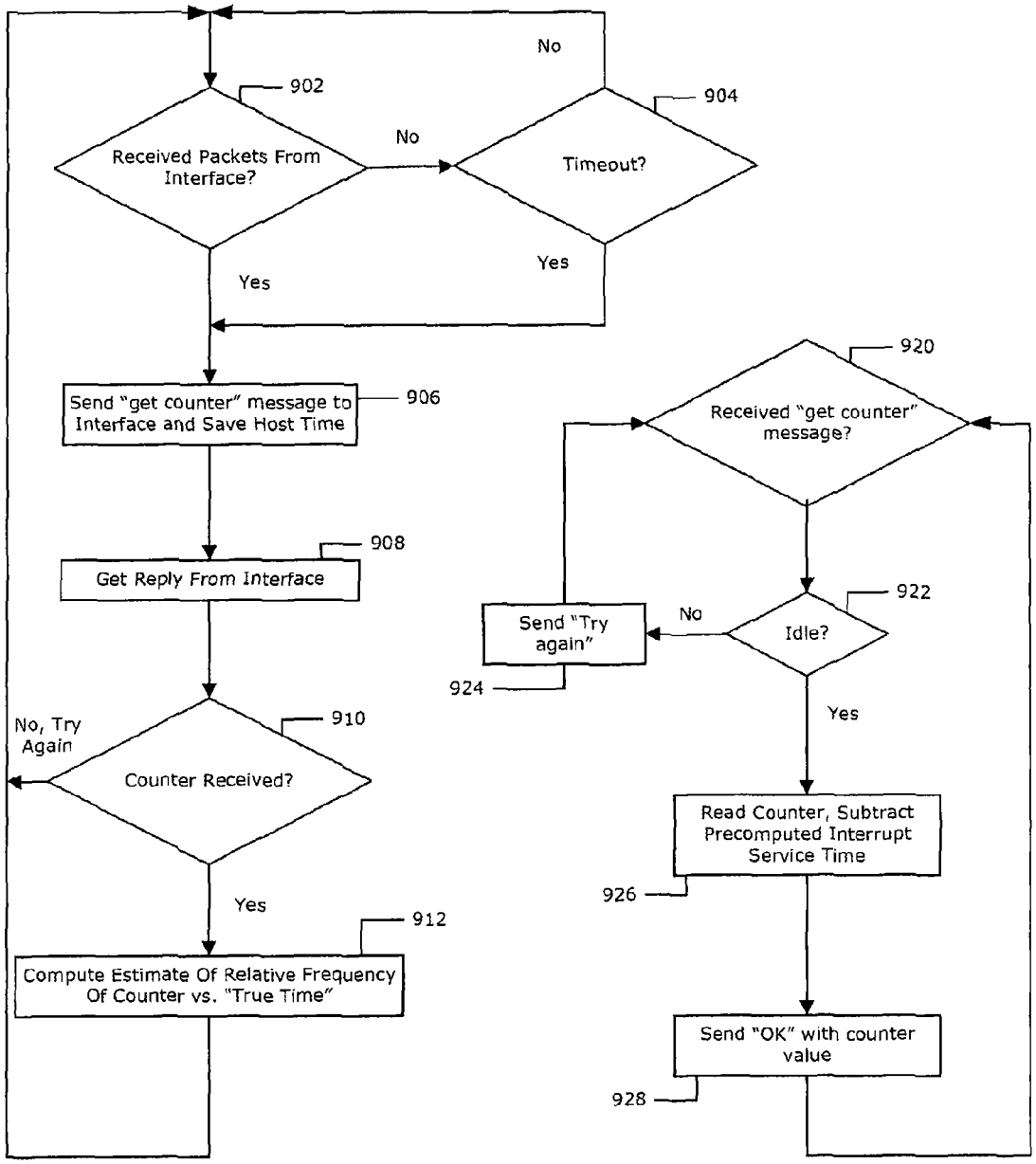
FIG. 9A is a flow chart illustrating operation of a host computer for synchronizing with an interface computer.
FIG. 9B is a flow chart illustrating operation of an interface computer for synchronizing with a host computer.

Referring to FIGS. 9A an 9B, if the host computer has received a set of packets from the interface computer (step 902), the host computer proceeds to request the counter value (step 906) from the interface computer by sending a "get counter" message to the interface computer. In an exemplary embodiment, the interface computer stores a set of packets in a memory of the host computer by a direct memory access (DMA) operation and then interrupts the host computer to indicate the transfer of packets. If the host computer has not received a set of packets, the host computer waits for packets for a timeout period (step 904), after which it requests the counter value (step 906). The host computer records the host clock's time (step 906) when it requests the interface counter value.

When the interface computer receives a "get counter" message (step 920) from the host computer, the interface computer then determines (step 922) whether it is currently idle or whether it is receiving data from the communication line. If not idle, the interface computer sends (step 924) a "try again" message to the host computer. If idle, the interface computer then reads the counter value and subtracts a precomputed interrupt service time (step 926) to generate an adjusted counter value. The interface computer then sends (step 928) the adjusted counter value to the host computer.

The precomputed interrupt service time corresponds to the duration of time between when the interface computer receives the counter request from the host to when the interface computer provides the host computer with the adjusted counter value. The precomputed interrupt service time may be determined experimentally using a logic analyzer, for example to measure the duration of time between when the interface receives the request for the counter until the interface provides the counter value. To match the experimental delay measurements to the delay during normal operation, the experimental request is provided to the interface when the interface is known to be idle and the interface only services a request during normal operation when idle. As known to those skilled in the art, the response time of the interface computer may be taken repeatedly to generate an average service time for use during operation.

Upon receipt of the counter value, the host computer computes (step 912) an estimate of the relative frequency of the interface clock counter to the host computer clock. The relative frequency may be used to correlating counter values associated with packets received from the interface computer until the next execution of the synchronization routine. In an exemplary embodiment, the host computer subtracts a host interrupt service time from the time recorded in step 906 before computing the relative frequency to account for the delay between the time when the host receives the count from the interface to the time when the host computes the relative frequency.

In an exemplary embodiment, a multiple network interfaces each coupled to a respective communication line are implemented as a single unit and share a common clock. Thus, synchronization with only the common clock synchronizes the host clock with the time stamps associated with data received from any of the respective communication lines.

FIGS. 10-28 are exemplary screen displays illustrating a graphical user interface (GUI) for displaying data collected and analyzed by a network monitor and for controlling data analysis by a network monitor according to the present invention. The display in FIG. 10 includes a tables frame 1010, a second frame 1030, and a buttons frame 1050. The tables frame 1010 includes a first portion 1011 with selectable boxes for user selection and text input boxes and a second portion 1012 with tables of statistics corresponding to received data. The tables 1023 which appear below the selectable buttons, boxes and fields include entries corresponding to the particular data being analyzed. The plots frame 1030 includes plots 1032, 1034 illustrating statistics corresponding to received data. The buttons frame 1050 includes a set of user-configurable buttons.

Figure 10:
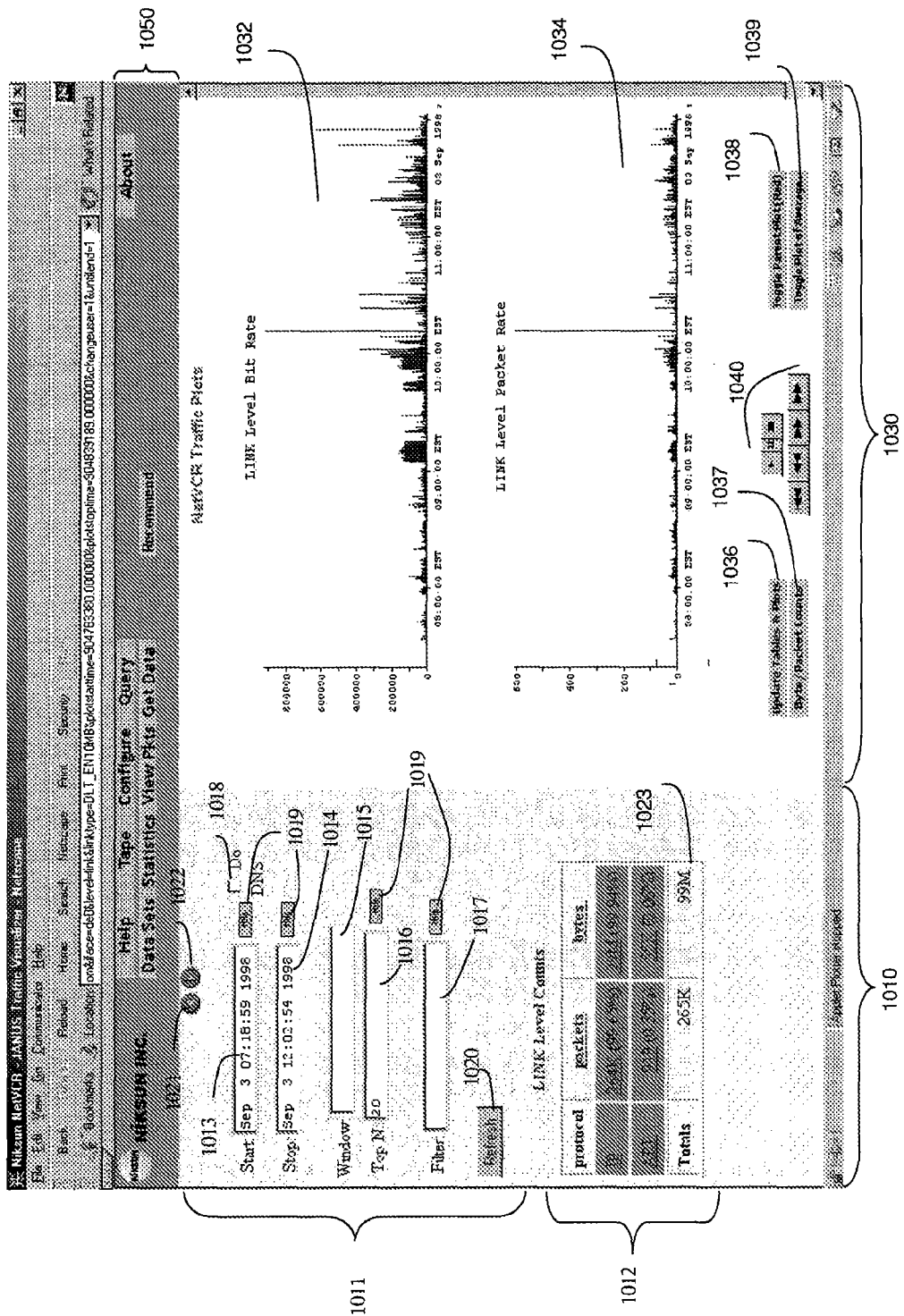

The text input boxes and the selectable boxes in the first portion 1011 of the tables frame 1010 may optionally be fixed to prevent user selection of the options and prevent user entry in the text boxes. The functions associated with the options and boxes displayed in FIG. 10 are described below:

1. Start: The start field 101 specifies the beginning time from which the traffic is analyzed and its results are displayed in the GUI.
2. Stop: The Stop field 1014 specifies the ending time to which the traffic is analyzed and its results are displayed in the GUI. Thus the Start/Stop fields 1013, 1014 specify the time between which the traffic has been analyzed and presented to the user via the GUI. The contents of the Start and Stop fields 1013, 1014 may be displayed in multiple formats. For example, the contents are shown in a date format in FIG. 10. Alternatively, the contents may be displayed as +/− hours to indicate that a time relative to the current time, the term "now" may be used to represent the current time, or the term "never" may be used to represent that the data should be continuously updated.

3. Window: The Window field 1015 indicates the time intervals at which to compute values to be plotted in the second frame 1030. For example, if a user enters "1" as the Window field, then the values in the plot field are plotted every second. The user may enter the values in the Window field in using units as appropriate to indicate the resolution of the plots (e.g. 1 s, 1 ms, 100 us, . . . to indicate a time resolution if the unit of the horizontal scale is time). An empty Window field 1015 indicates that the resolution on the horizontal scale should be automatically set.

4. Top N: The Top N field 1016 specifies the maximum number of entries for the tables 1023 which appear in the second portion 1012 of the tables frame 1010. If Top N is 10, then the table 1023 will include 10 rows sorted by a particular column value in descending order. If Top N is −10, then the table 1023 will include 10 rows sorted by a particular column value in ascending order (i.e. this becomes the notion of BottomN).

5. Filter: The Filter window 1017 describes a filter to be applied to the data to be displayed. For example, Filter could be "protocol IEEE802.3" to display results for packets with link layer protocol IEEE802.3. For data previously filtered to show only IP traffic, a Filter of "host 10.0.0.1" would display results for IP traffic where either the source or destination host was 10.0.0.1. Various complex filters are also possible.

6. Do DNS: The Do DNS checkbox 1018 converts entries in the tables 1023 from a numerical representation to a textual representation. For example, in IP a numerical representation (the IP address) is used to identify a host. A DNS (Domain Name Server) may contain a mapping from this numerical representation of the IP address to a textual representation. For example, the IP address 10.0.0.1 may be converted to the textual representation foo.niksun.com when the Do DNS checkbox is checked. For protocols other than DNS the label given to the checkbox will vary accordingly with an equivalent functionality.

7. Help: The help buttons 1019 next to each field when selected cause display of context-sensitive assistance. For example, if the help button next to Filter 1017 is selected, a help window for Filters would pop up.

8. Refresh: The Refresh button 1020 refreshes the contents of all frames.

9. Forward and Backward Buttons: The forward 1021 and backward 1022 buttons at the top of first portion 1011 of the tables frame 1010 function similar to the "Forward" and "Back" buttons of a browser with the added feature of keeping the contents of all frames aligned. In contrast, clicking the "Forward" and "Back" buttons of a browser causes forward of backward movements on a frame by frame basis hence loosing correspondence between the various frames.

The plots frame 1030 includes plots 1032, 1034, text input boxes and selectable boxes and buttons. The text input boxes and the selectable boxes may optionally be fixed to prevent user selection of the options and prevent user entry in the text boxes. The functions associated with the options and boxes displayed in the plots frame 1030 of FIG. 10 are described below:

1. Update Tables and Plots: This button 1036 updates the tables and frames in a coordinated manner. For example, if a user zooms in by selecting a portion of the plot with a mouse, then clicking this button 1036 would update the plots and tables for the selected time range that was zoomed into.

2. Byte/Packet Counts (and Bit/Packet Rates) (and Utilization): This button 1037 changes between one of three options upon selection: "Byte/Packet Counts", "Bit/Packet Rates", and "Utilization". The plots also change from Byte/Packet Counts over a certain window, to Bit and Packet Rates (i.e. number of bits or packets per second), to Utilization accordingly. In an exemplary embodiment, the byte plot displays normalized values relative to the link speed (i.e. bit rate divided by link or channel or virtual circuit capacity in bits per second).

3. Toggle Parent Plot: This button 1038 toggles the line on the plots as described below.

4. Toggle Plot of Average: Selection of the Toggle Plot of Average button 1039 toggles whether the average value (not shown) of the y-axis of the plots is displayed.

5. Play/Forward/Stop/Fast Forward/Rewind/Fast Rewind/Pause Buttons: These buttons 1040 control the playing of the plots on the screen to allow the plots to be updated over time and to scroll with time. The tables 1023 in the table frame 1010 are be updated to match the plots 1032, 1034.

6. Top Plot: The top plot 1032 shown in FIG. 10 is a Link Level Bit Rate plot in bytes/second.

7. Bottom Plot: The bottom plot 1034 in FIG. 10 is a Link Level Packet Rate blot in packets/second.

The table 1023 in the tables frame 1010 is automatically generated based upon protocols found to be active in the interval specified by the Start 1013 and Stop 1014 fields. In FIG. 10, the table 1023 shows that between the Start and Stop times, 264K (K=1000's) IP packets and 919 ARP packets were received by the network monitor. The IP packets and ARP packets containing 99 M and 55K bytes, respectively (M=1,000,000).

The entries in the table 1023 are selectable to sort data by the selected field. For example, if the packets heading in the table was clicked then the table would be sorted by the packets column in descending order of activity and if this header is clicked again, then it would be sorted in the opposite order. Selection of the other table headings similarly sorts the entries.

Figure 11:
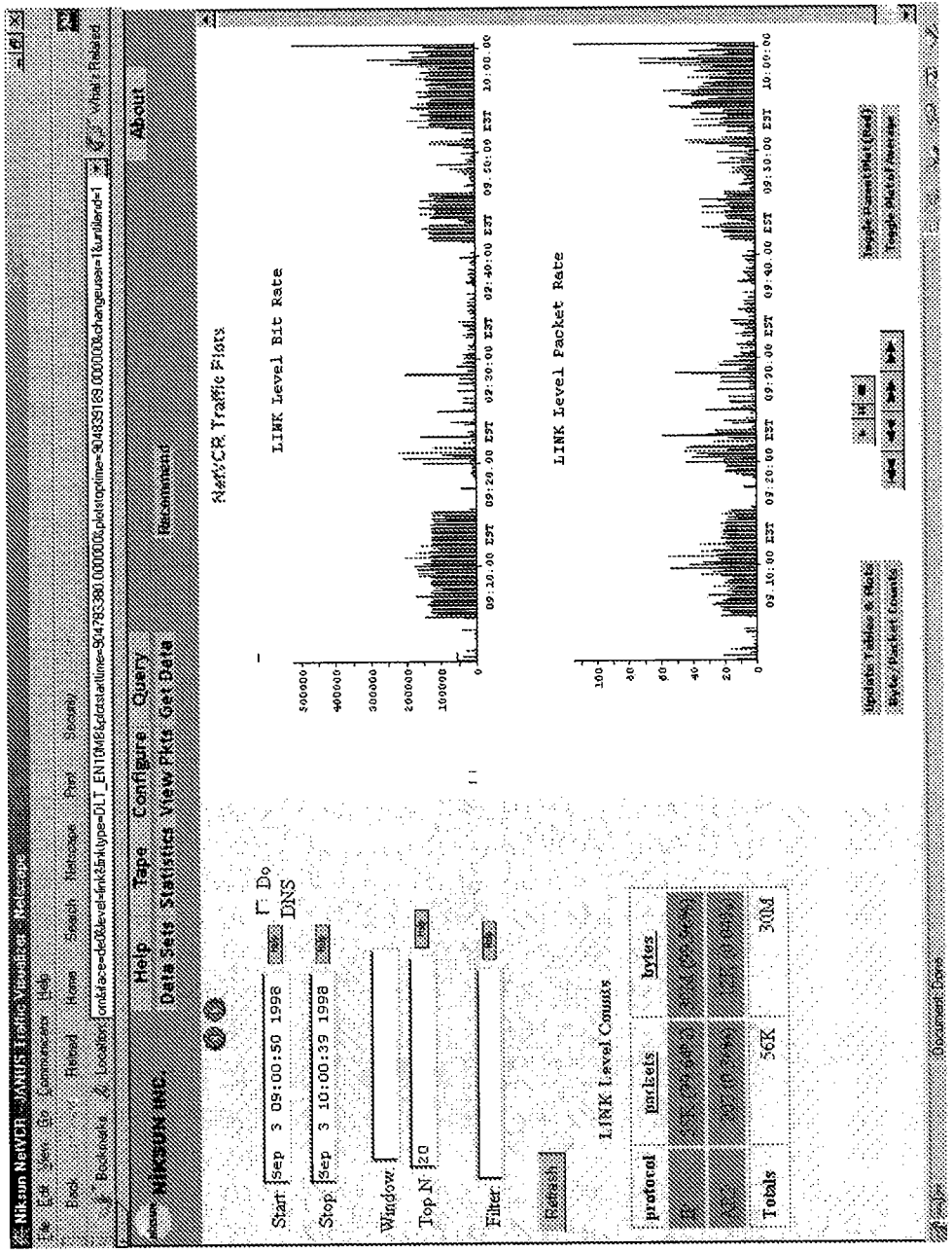

FIG. 11 illustrates the zooming capability of the present invention. The start/stop time interval of 7:18/12:02 in FIG. 10 is narrowed to the 9:00/10:00 time interval in FIG. 11. The table 1023 and plots 1032, 1034 have been updated accordingly. The start 1013 and stop 1014 field values may be adjusted by either manual entry in the fields 1013, 1014 themselves, or by graphical selection, by a mouse for example, of an interval of time in the plots 1032, 1034. Upon selection, the display will zoom into the selected interval. Zooming in on the plots causes the plots to be regenerated for the interval selected by the user. Selection of the "Update Tables and Plots" button 1036 will then synchronize data in the tables frame 1010 to the plots 1032, 1034. The plots could also be updated automatically, if the user selected the "auto-synch" feature (not shown). The "Update Tables and Plots" button 1036 allows a user to zoom in several times to a desired time interval without updating the data. This provides the advantage of reducing unnecessary processing by the network monitor until the final interval is chosenf.

The protocols listed as entries in the table 1023 in FIG. 10 are selectable by a user, as hyper-links, for example, to list protocols encapsulated within the selected protocol. Clicking or selecting the IP entry in table 1023 in FIG. 10 results in the display of FIG. 12. The selection causes the plots 1032, 1034 in the plots frame 1030 of FIG. 10 to automatically update to show only IP traffic in plots 1232, 1243 in FIG. 12.

The plots illustrate all traffic from the link layer as a line chart 1235 and all IP traffic as a bar chart. This dual-display format provides a graphical representation of the perspective between all traffic of one level (IP in this case) compared to all traffic of a previous level (Ethernet in this case).

The contents of the tables in the tables frame 1210 are also updated to correspond to IP traffic. Table 1223 lists all IP protocols which were in use on the link being monitored between the "Start" and "Stop" times. In this particular case, only TCP, UDP and ICMP IP protocols were found. Activity by IP hosts may also be displayed. By scrolling down the table frame 1210, the table of IP counts by source host is seen as illustrated in FIG. 13 for the case where TopN=2.

Figure 13:
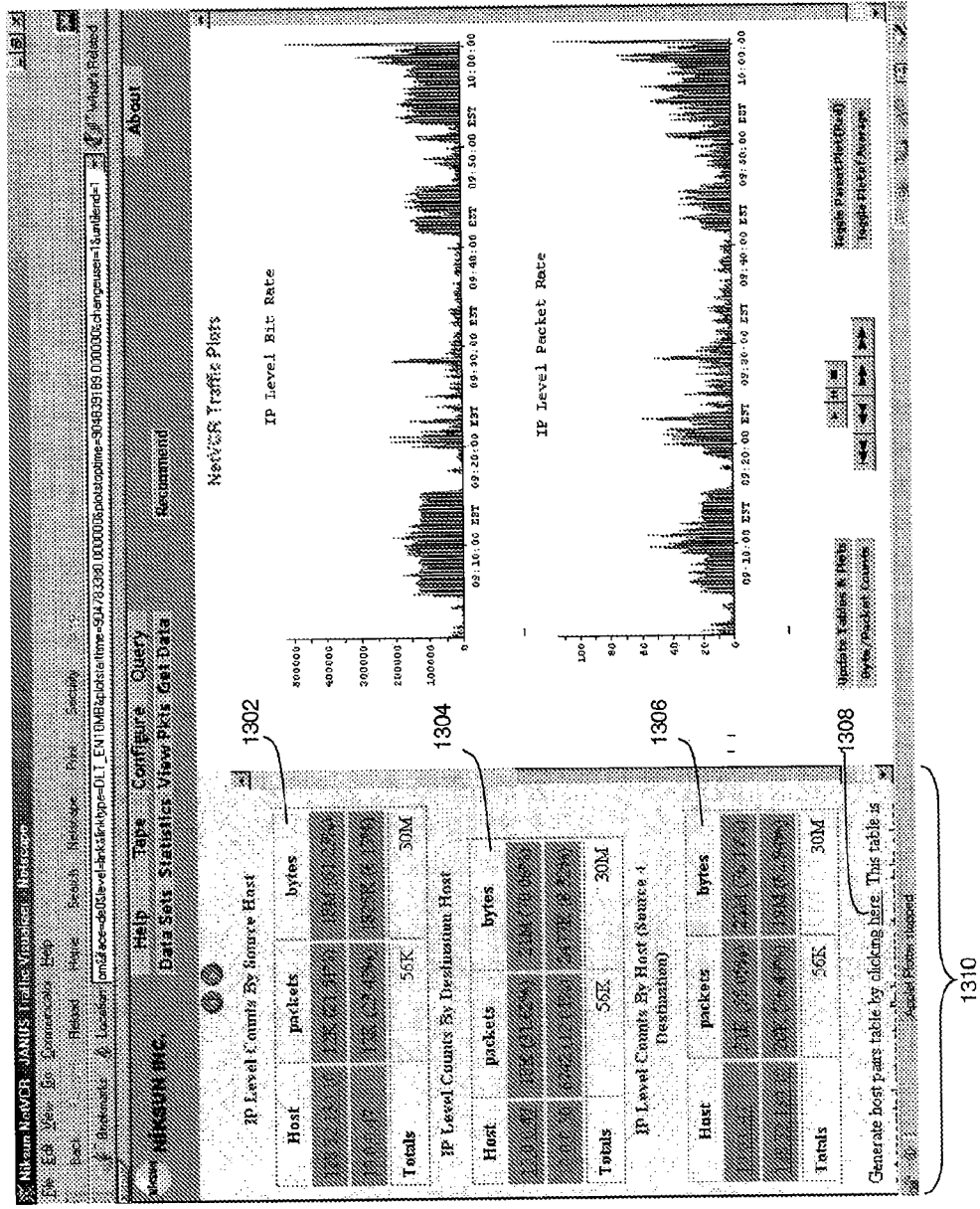
Figure 14:
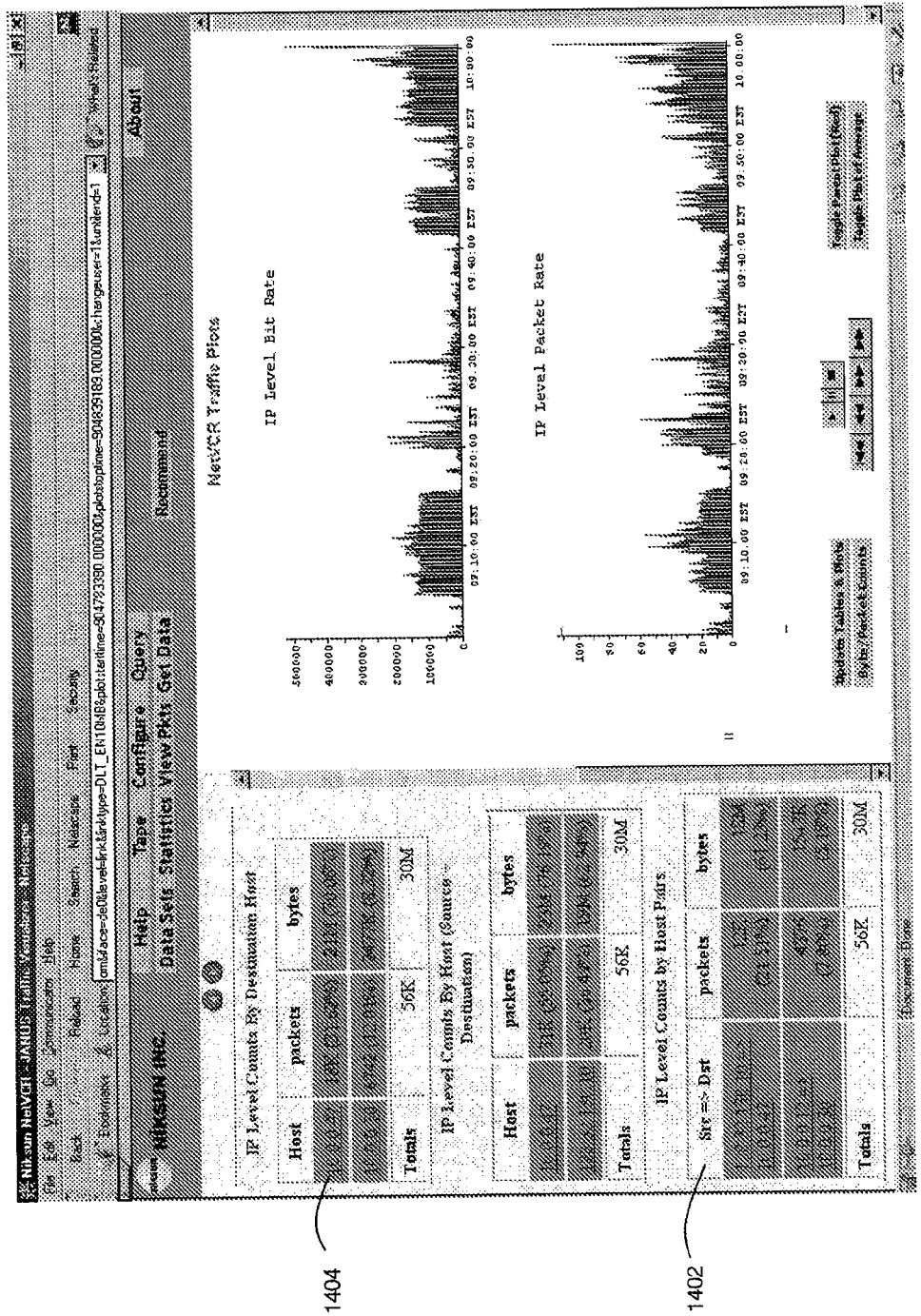

In FIG. 13, traffic is displayed in a source host table 1302 for traffic generated by hosts, in a destination host table 1304 for traffic received by a host, and in a host table 1306 for traffic generated and received by a host. Clicking on a link 1308 in the tables frame 1310 will generate a display of a "host-pairs" table 1402 shown in FIG. 14.

The host-pairs table 1402 lists the total number of packets and bytes sent between pairs of hosts for each identified pair.

Figure 15:
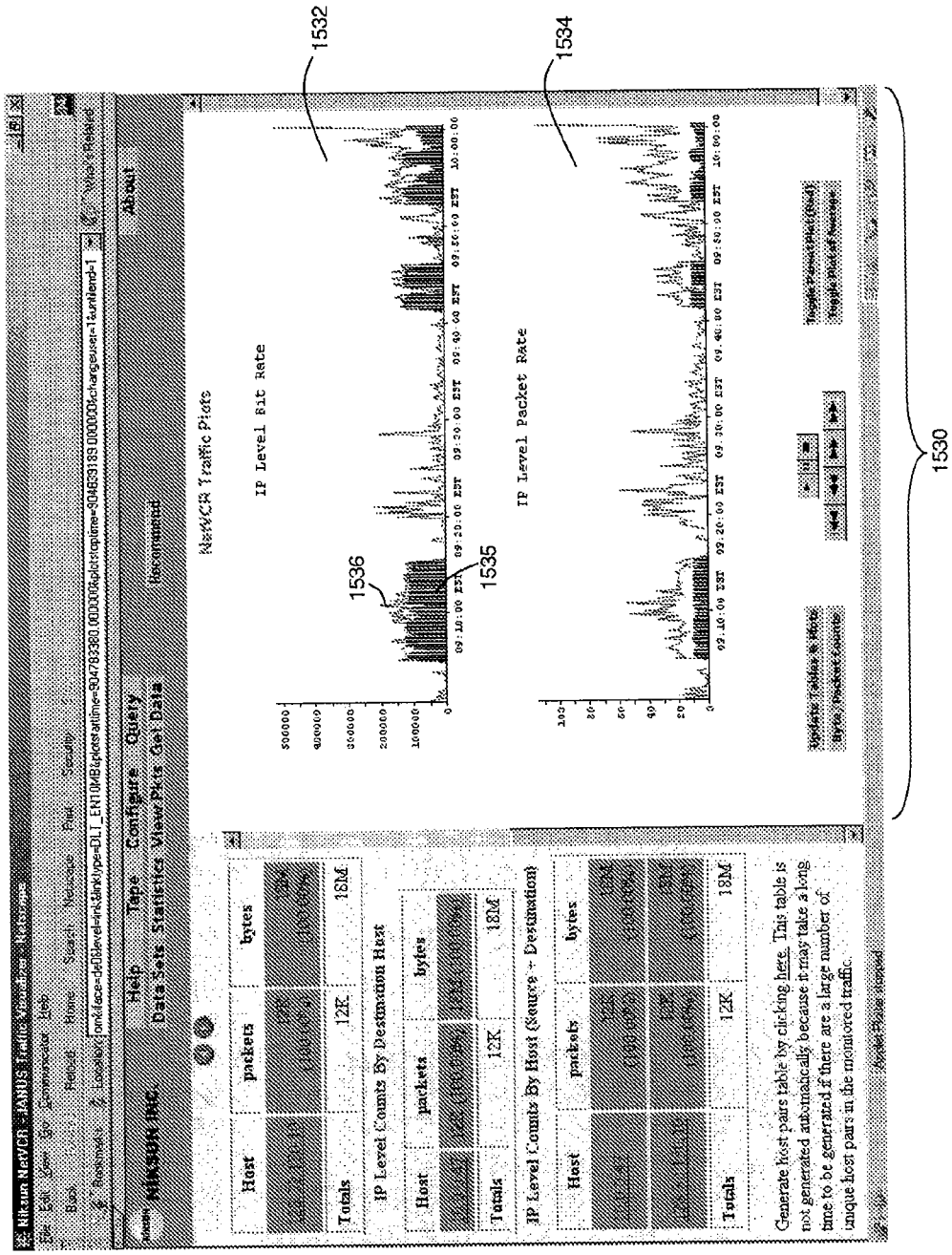

Selection of a "destination host" such as 10.0.0.47 (1404 in FIG. 14) will further filter the traffic by the selected "destination host" to show only traffic destined for host 10.0.0.47. This is illustrated in FIG. 15 where table 1502 shows traffic destined to 10.0.0.47, all from host 128.32.130.10 in this case for traffic monitored between the start and stop interval.

Thus, we see that only host 128.32.130.10 was sending traffic to 10.0.0.47 between the "Start" and "Stop" times. Note that the plots 1532, 1534 in the plots frame 1530 now show this activity between these two hosts as a bar chart 1535 and all IP traffic as a line chart 1536. Colors may also be used to distinguish the data in the plots or tables.

Figure 12:
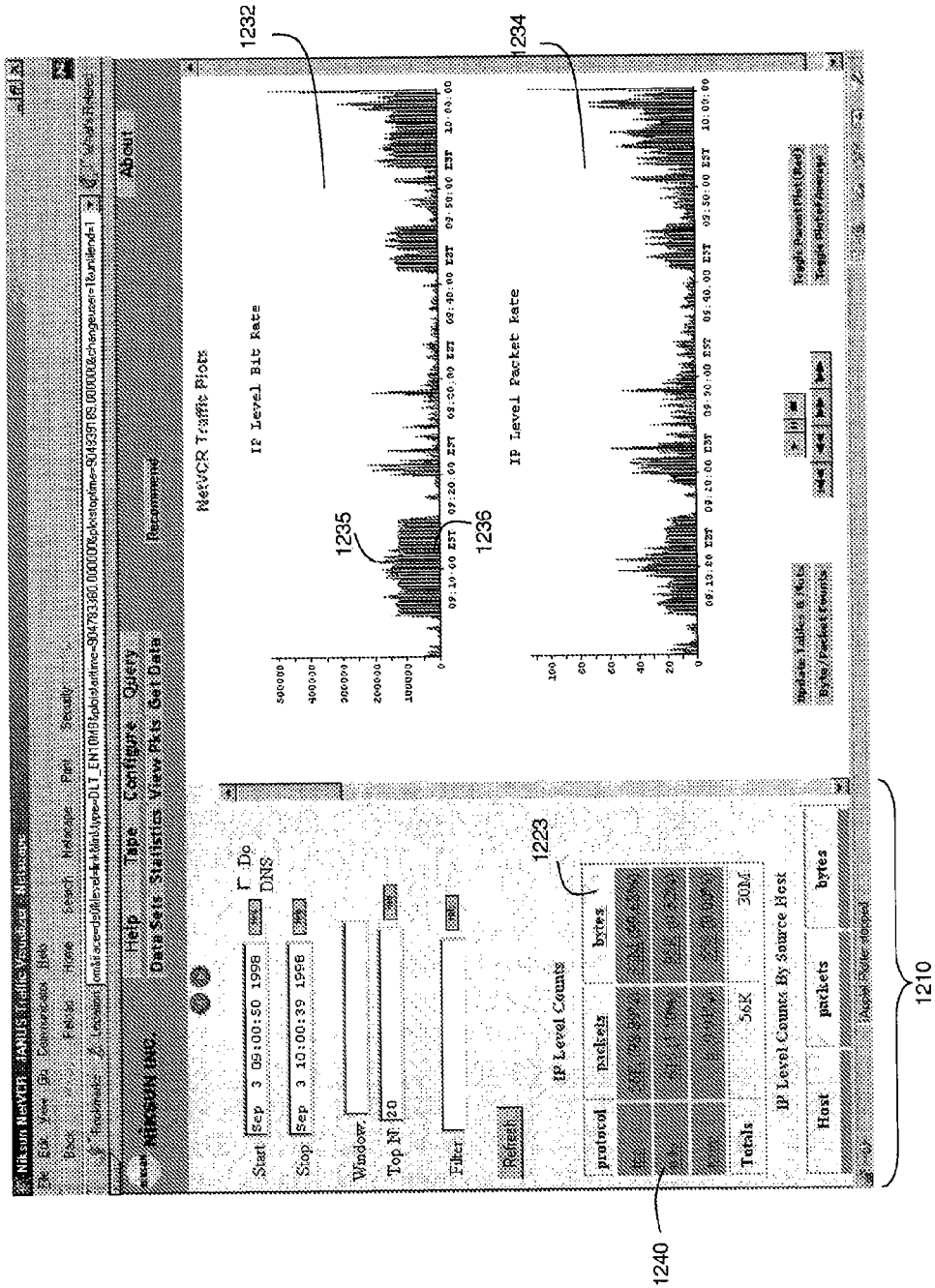
Figure 16:
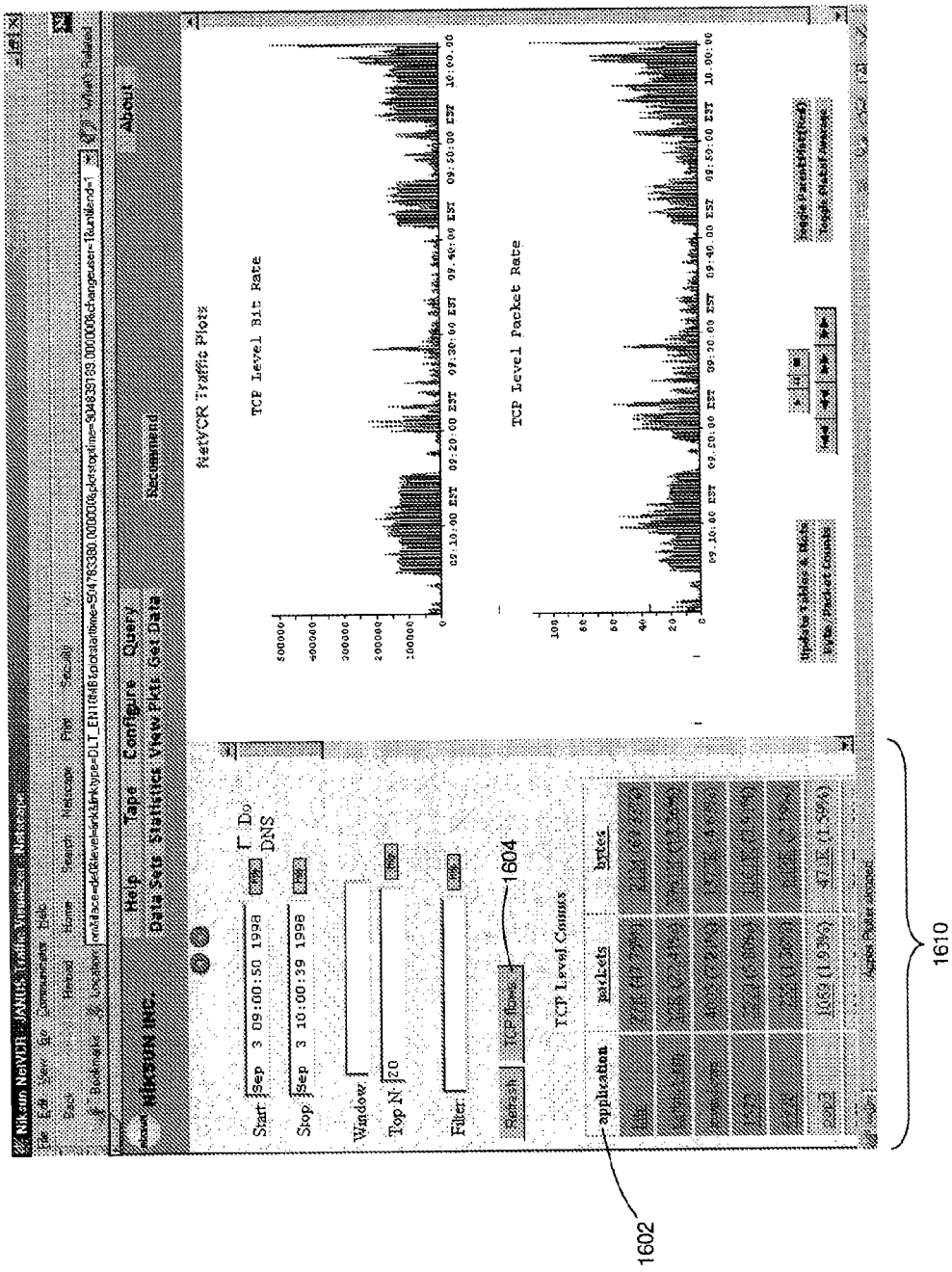

If the TCP entry in table 1223 in FIG. 12 is selected, we move up the protocol stack and the tables frame 1610 is updated as shown in FIG. 16 to include TCP level counts for each underlying application 1612. For example, there were 27K HTTP (web) packets which contained 21 MegaBytes which were received during the designated time interval.

Figure 17:
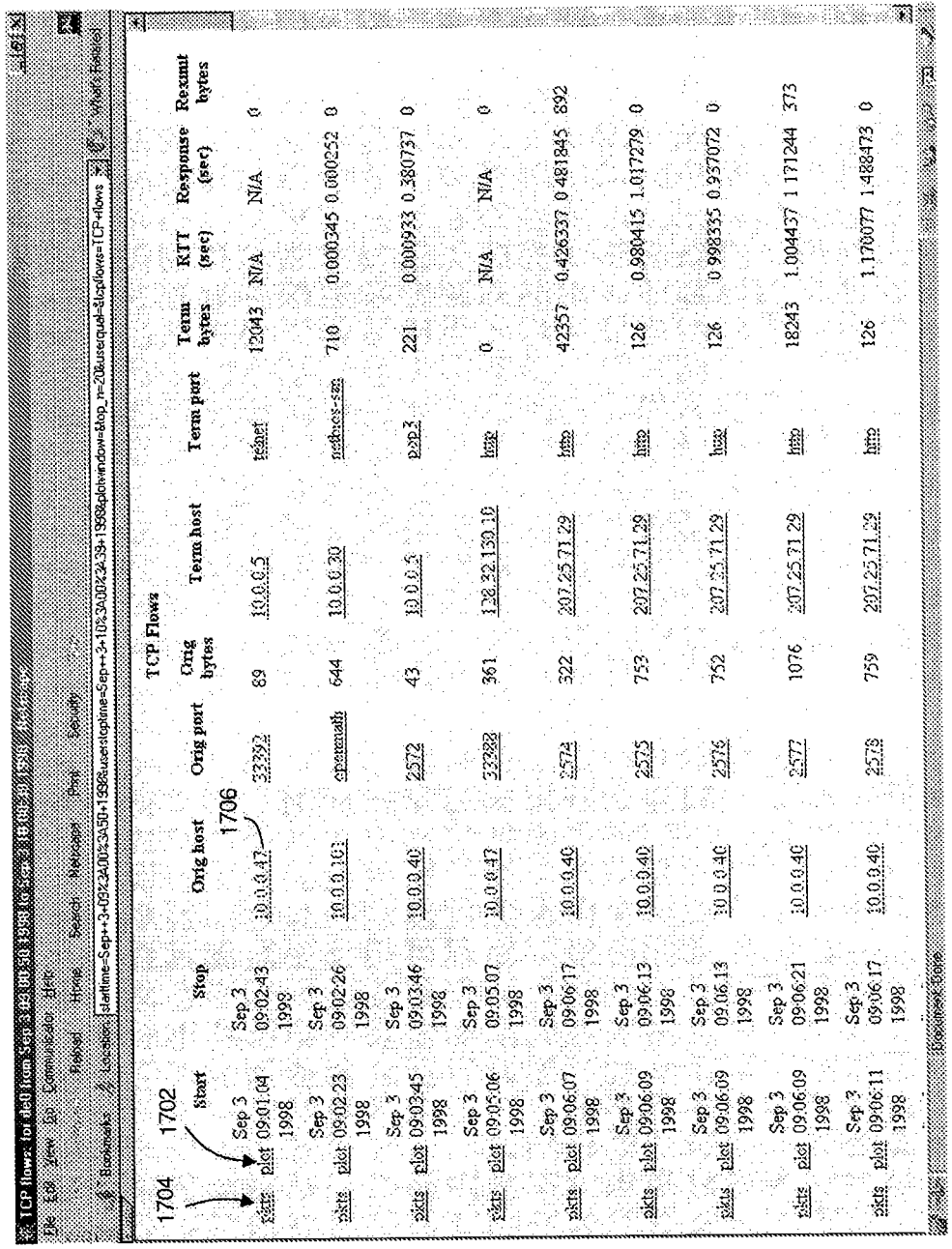

In FIG. 16, if the "TCP flows" button 1604 is selected, all TCP flows are displayed with their time durations and performance metrics as shown in FIG. 17. A TCP flow contains a set of packets belonging to one TCP session between two hosts. Each flow may be plotted or its corresponding packets viewed by selecting the "plot" button 1702 or the "pkts" button 1704, respectively, corresponding to the desired TCP flow. Note that if the Do DNS option had been selected, all TCP host IP addresses would be replaced by their respective names (e.g. foo.niksun.com). A user may aggregate flows by clicking on other links such as the ones that identify a particular host such as 10.0.0.47. If a user clicks on 10.0.0.47 (1706), aggregated flows for host 10.0.0.47 will be displayed as shown in FIG. 18.

FIG. 18 shows all TCP flows originating from host 10.0.0.47. The display in FIG. 18 is generated by applying a filter selective to the 10.0.0.47 host to the data displayed in FIG. 17. Further filters can similarly be applied by clicking on other hosts (hyperlinks) in FIG. 18. For example, in the "Term host" column, if a user selects host 10.0.0.5 (1802), then all TCP flows between host 10.0.0.47 (as source) and host 10.0.0.5 (as destination) are displayed.

Figure 19:
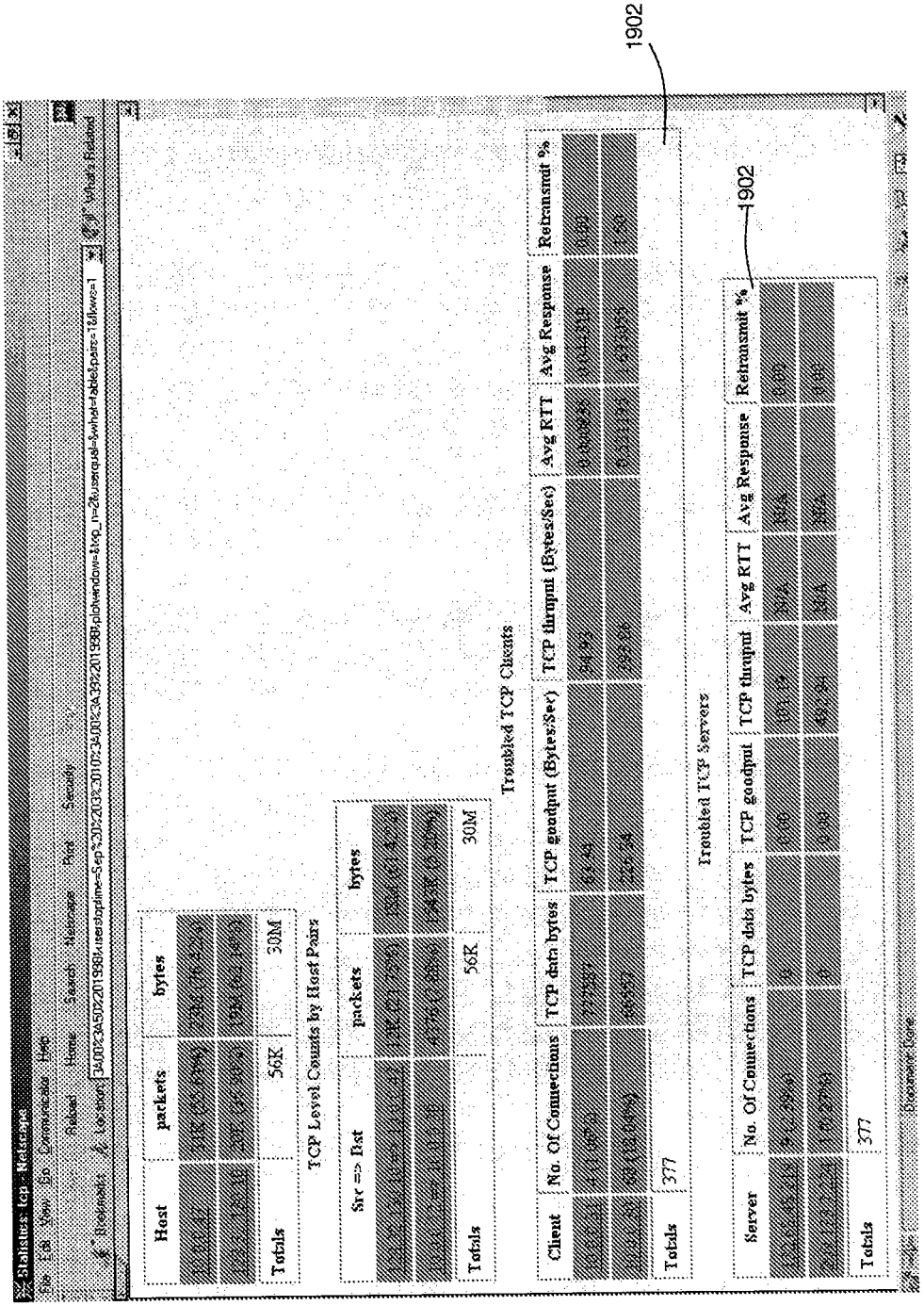

A "TCP performance" selection may be provided, in the screen display of FIG. 16, for example, for generating TCP performance tables. By clicking on the "TCP performance" hyperlink, performance tables 1902 for TCP are displayed as shown in FIG. 19. The whole tables frame is displayed in FIG. 19 or clarity. The display includes a "Troubled TCP Clients" table and a "Troubled TCP Servers" table for the worst two performing TCP clients and servers (TopN field value of 2). Over the time interval specified by the Start and Stop fields, the tables show the following measurements for each TCP client or server:

1. No. of Connections: This is the total number of TCP connections to the client or server.
2. TCP Data Bytes: This shows the total number of data bytes carried by all the TCP connections.
3. TCP goodput (Bytes/sec): This shows the TCP payload throughput (application throughput) or TCP goodput. That is, the total number of application bytes divided by time it takes to send these bytes averaged over the number of connections.
4. TCP throughput (Bytes/sec): This shows the total number of bytes carried in the TCP connections divided by time (TCP flow rate).
5. Avg RTT: This shows the average Round Trip Time between the client and server over the number of connections.
6. Avg Response: This shows the average response time from the server to the client.
7. Retransmit %: This shows the percentage of TCP bytes which were retransmitted (due to congestion, loss, or delay, or any other reason).

The TCP performance tables may be customized to add other metrics or delete existing metrics via the user interface.

Figure 20:
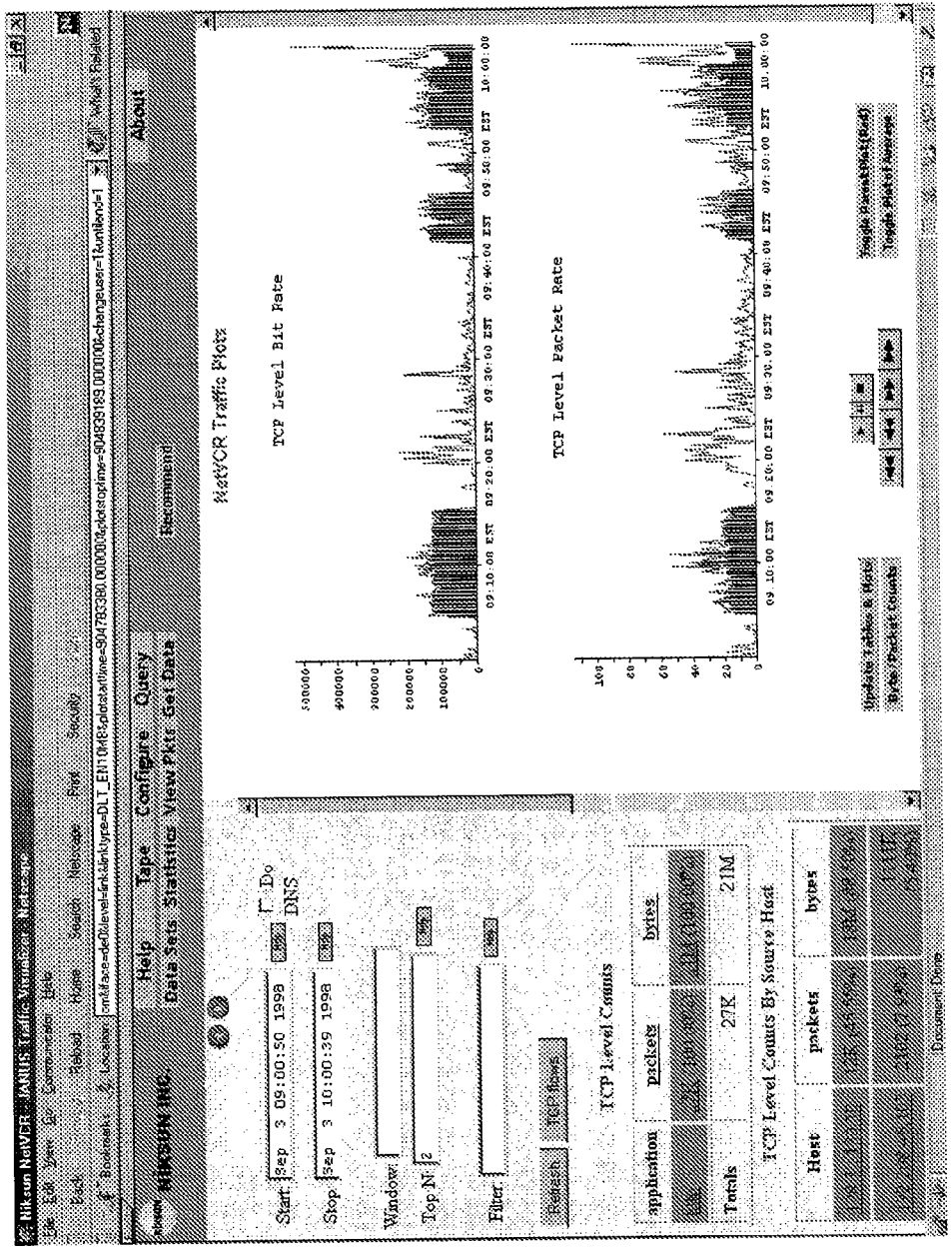

Selecting the http hyperlink in FIG. 16 results in the display of statistics for web traffic (http) as shown in FIG. 20.

Figure 21:
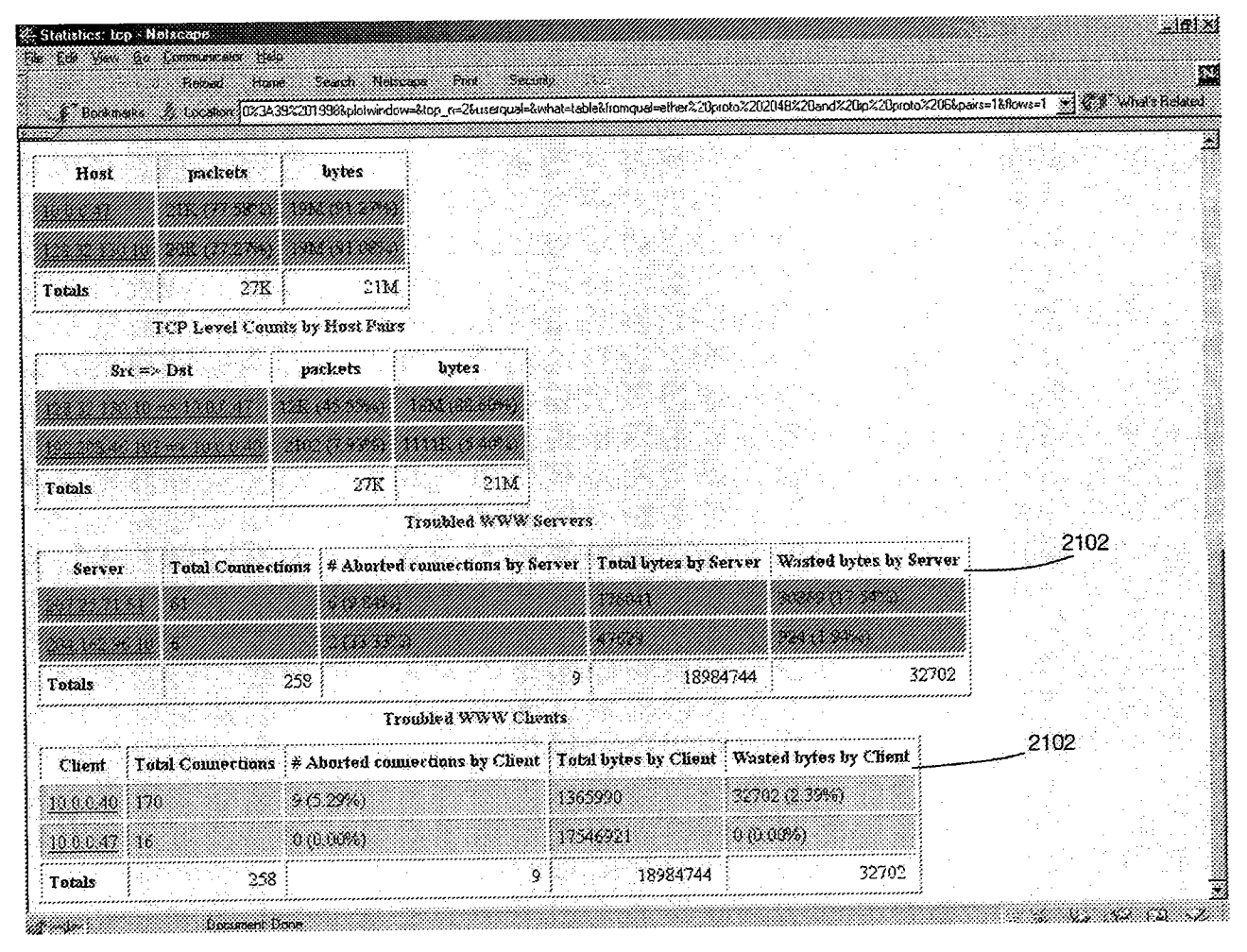

An "http performance" selection may be provided, in the screen display of FIG. 20, for example, for generating http performance tables. By clicking on the "http performance" hyperlink, performance tables 2102 for http are displayed as shown in FIG. 21. The whole tables frame is displayed in FIG. 21 for clarity. The display includes a "Troubled WWW Clients" table and a "Troubled WWW Servers" table for the worst two performing WWW clients and servers (TopN field value of 2).

The metrics in the http performance tables 2102 may be generated online and displayed to the user as troubled www clients and www servers or may be fed directly to a network management system for immediate action. These metrics can help a network administrator to identify bad servers and connections. This information may also be used to as the basis to notify the web server operator to buy more bandwidth or to fix his server. Further, it can be used to notify clients that they may need more bandwidth or they may need to choose another service provider. Accordingly, these metrics may be used to improve the quality of service given to users and ultimately may provide further revenue to the network administrator. For example, in the table "Troubled WWW Servers", the second server listed (204.162.96.10) had about 33% web aborts. This could indicate a potential loss of 33% of the customers from this web site.

The tables frame 1610 is updated as shown in FIG. 16 to include TCP level counts for each underlying application 1612. For example, there were 27K HTTP (web) packets which contained 21 MegaBytes which were received during the designated time interval.

Figure 22:
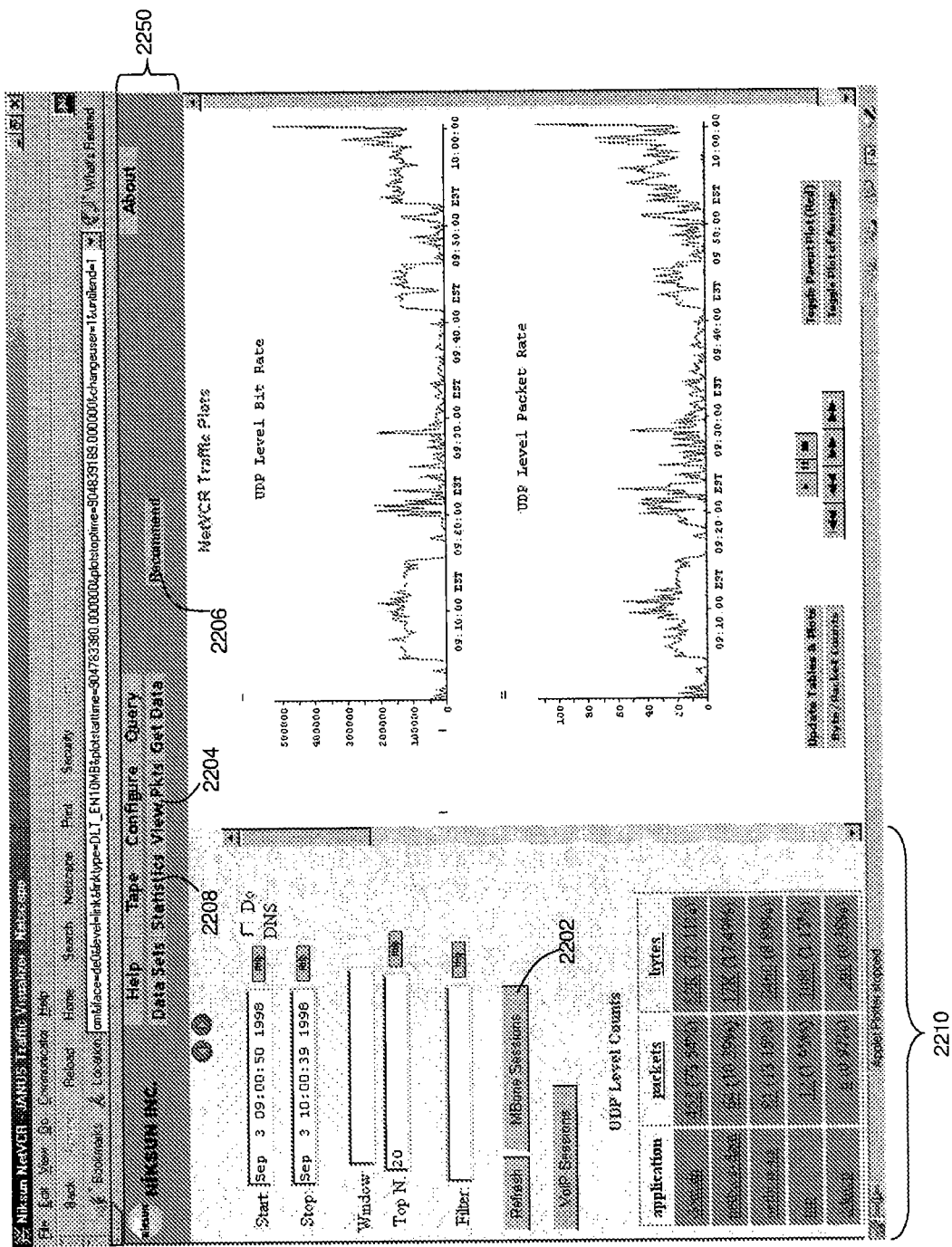

Upon selection of the UDP hyperlink 1240 in FIG. 12, we move up the protocol stack and the display of FIG. 22 is provided to illustrate levels of UDP traffic. In the tables frame 2210, a "UDP Level Counts" tables is displayed showing activity for each UDP application or UDP port. For example, the display indicated that there were 453 domain packets which contained 69 KiloBytes.

Note that UDP bandwidth usage was only about 0.32% of the total IP (see table 1223 in FIG. 12). Thus, the plots frame shows only IP traffic (RED graph) which dwarfs the UDP traffic (in BLUE). By clicking on the "Toggle Parent Display" the user can now zoom the Y-axis only on the UDP traffic (this is not illustrated) as the plot for IP (parent plot) will be removed.

Figure 23:
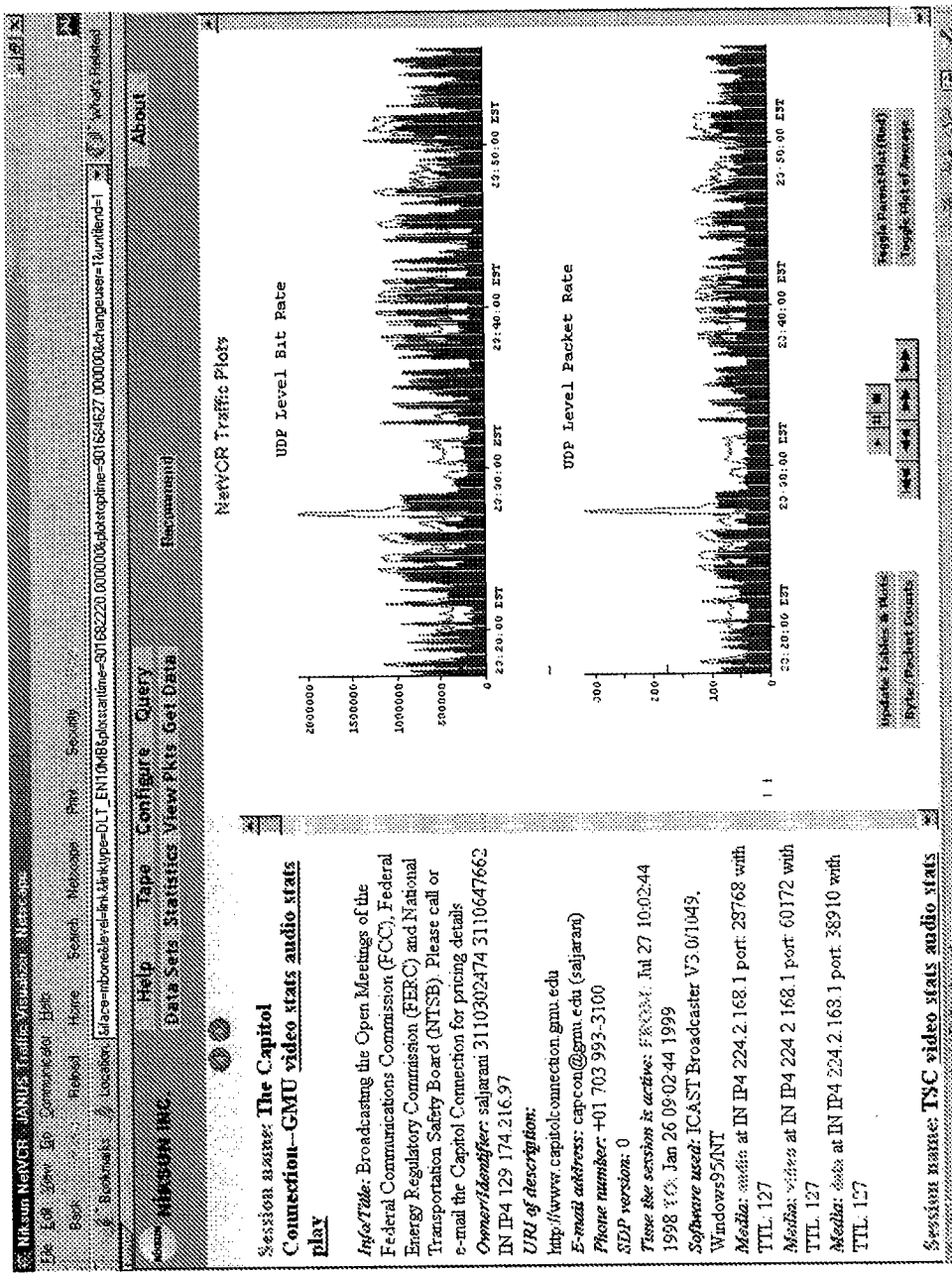

Selection of the "MBONE" button 2202 in FIG. 22 results in display of an application layer analysis of MBONE (Multimedia backbone) sessions as shown in FIG. 23.

Figure 24:
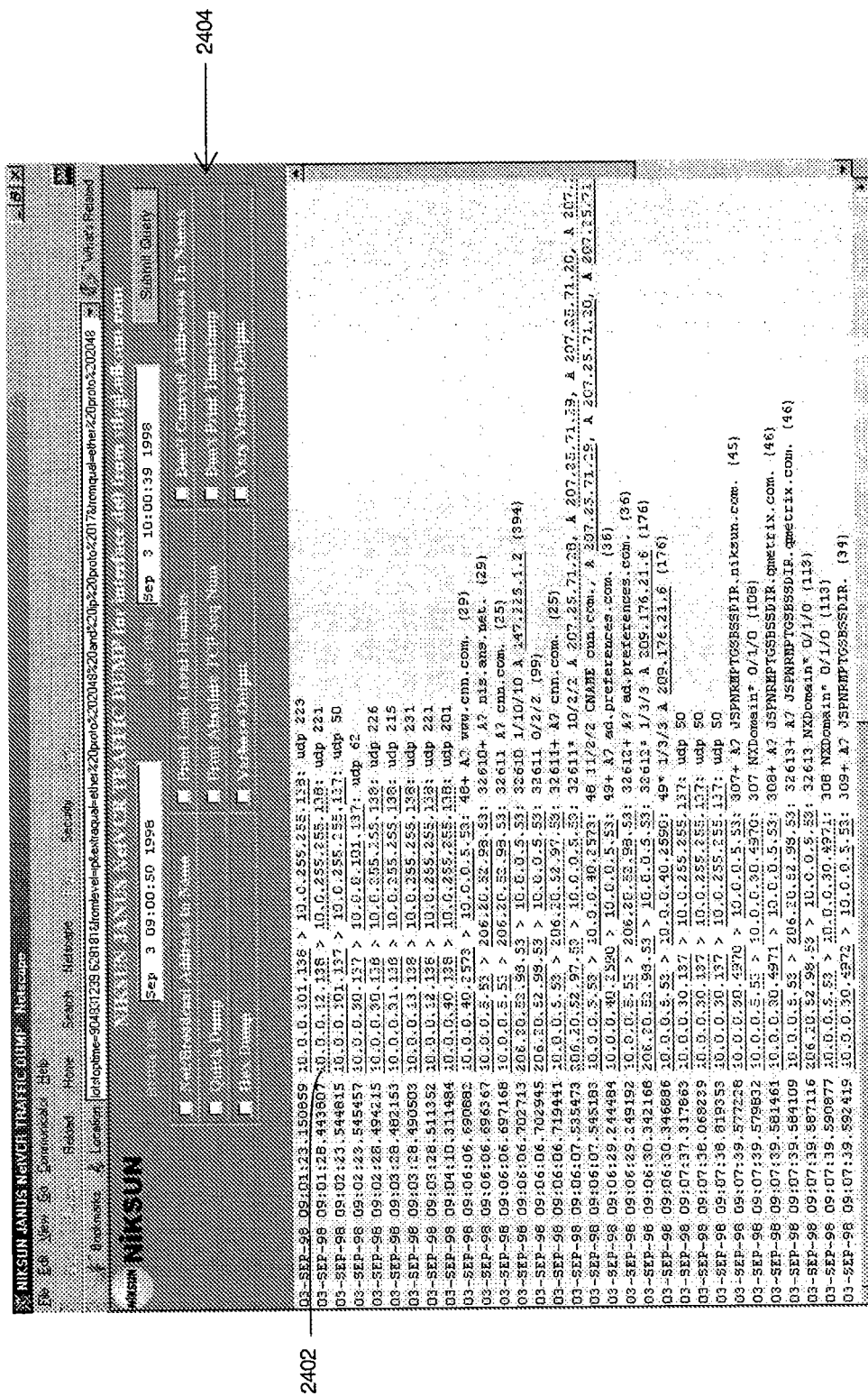

Selection of the "View Packets" button 2204 in the buttons frame 2250 in FIG. 22 gives a dump of all packets as shown in FIG. 24. Since the network monitor can record all packets, all packets and their contents can be viewed. The links in the display of FIG. 24 allow a user to flexibly filter the data streams. If the user clicks on 10.0.0.12 (2402), then the next screen of dumps will only contain packets to and from 10.0.0.12. In that next screen, if a user selected 10.0.0.5, then the updated display would show only packets between 10.0.0.12 and 10.0.0.5. A user could also further qualify the dump by selecting ports. Various options for dumping packets can be applied by selecting a type of dump from the selections 2404 at the top of the screen display.

Figure 25:
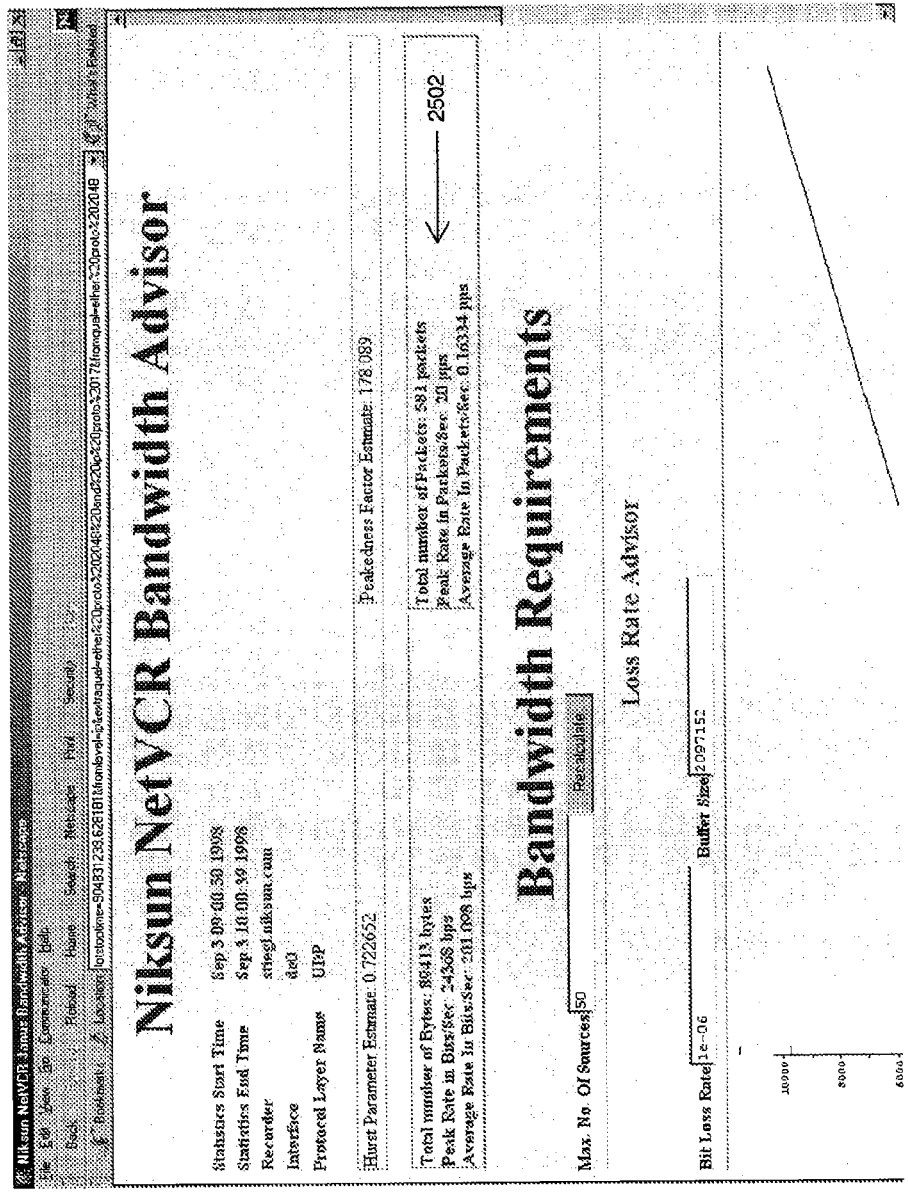
Figure 26:
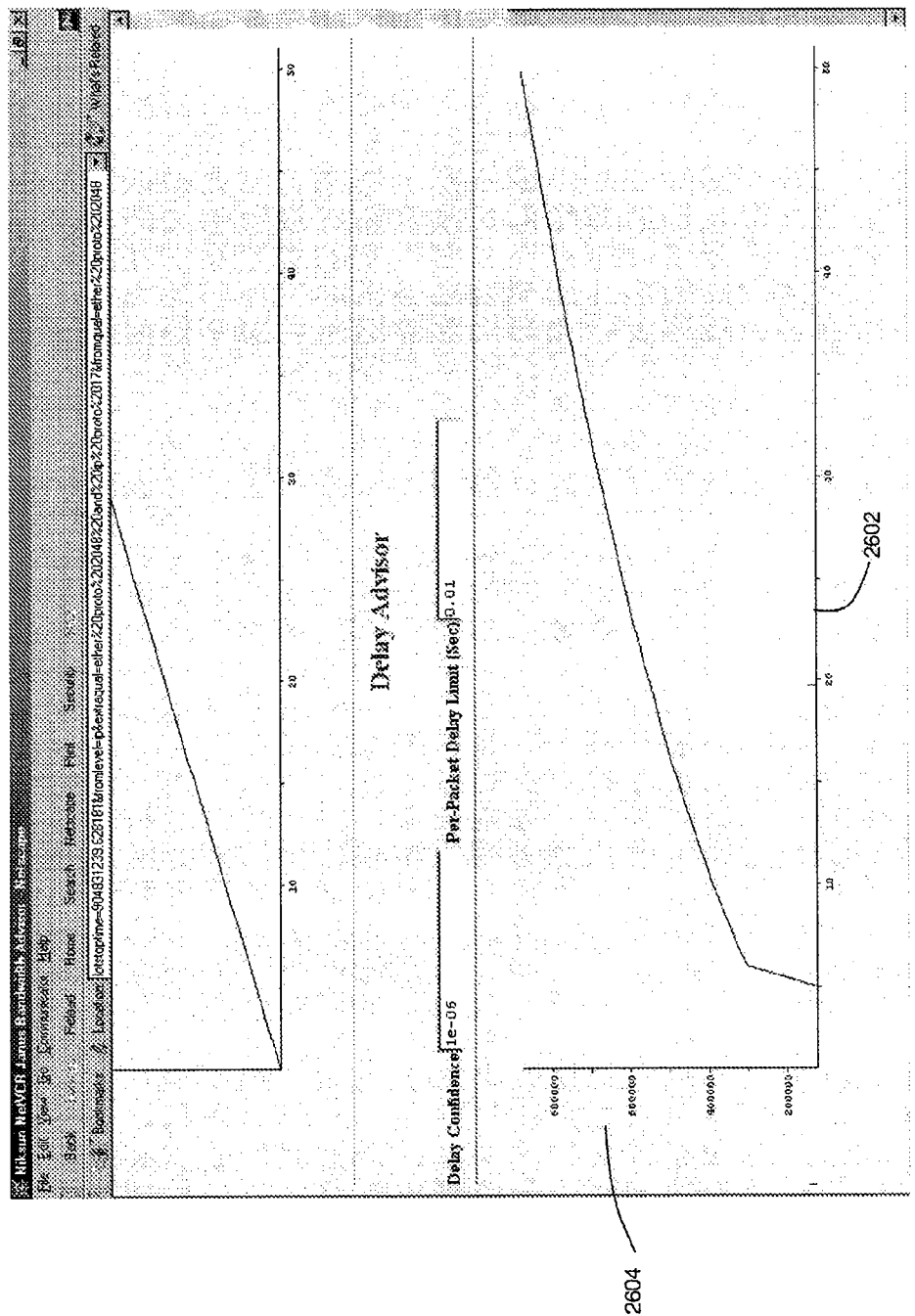

Selection of the "Recommend" button 2206 in the buttons frame 2250 of FIG. 22 results in the display of real-time capacity or bandwidth recommendations for the network. Upon detection of selection of the "Recommended" button 2206, the network monitor uses a mathematical model to interpret the data being viewed by the user to provide recommendations on bandwidth usage by an application (or other types of traffic) or on setting of link/switch capacity to obtain a specific quality of service. Several such statistics 2502 are shown in FIG. 25. A user may enter desired quality of service values such as loss rates and maximum delays to obtain recommendations on the capacity required to support the desired quality of service for the type of traffic analyzed. FIGS. 25 and 26 illustrate the recommendations which can be provided.

In an exemplary embodiment, the user may select a particular application and a "busy-period" for which she wants to "size" the network resources for a particular quality of service level. Appropriate subroutines in the network monitor then analyze the particular application traffic and extract or estimate "model parameters". Using the mathematical model, and estimates of the parameters, as well as parameters of quality of service (such as packet loss rates, network delays, frame rates, etc.) the model computes statistics such as statistical multiplexing gains, capacity requirements, and buffer allocations and provides the user with optimal recommendations of switch/router configurations, network resources, or server parameters to maximize network utilization while meeting the quality of service requirements. Such recommendations can be computed on a real-time basis where the statistic is updated for every packet or a set of packets belonging to different services and feedback can be provided to network elements along the path for each flow on optimal configurations to enable dynamic resource allocation to meet service quality requirements.

Figure 27:
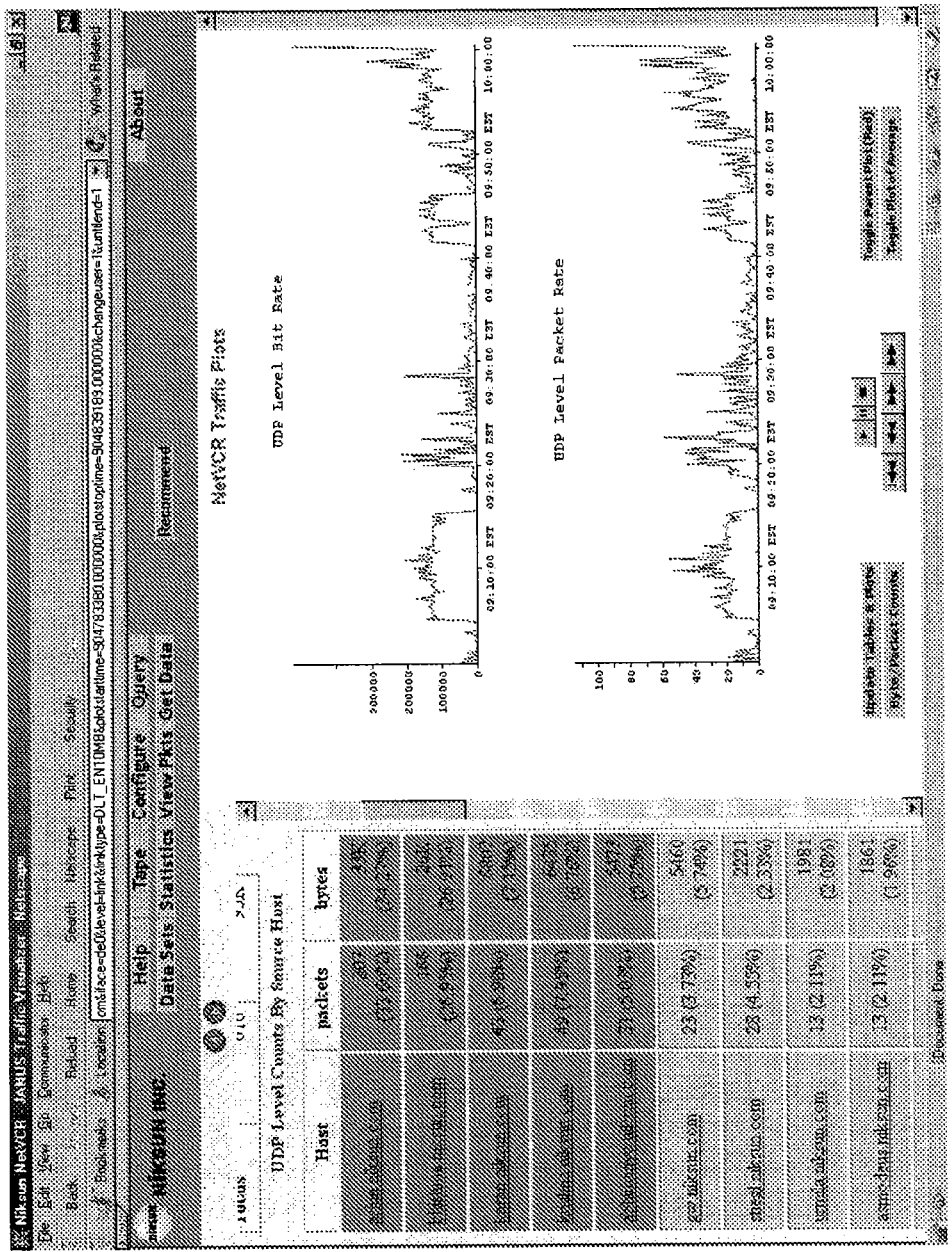

The x-axis 2602 of the graph represents the number of users and the y-axis 2604 represents capacity in bits/second. For a desired number of users, the capacity can be read off the chart or from a display of corresponding tabular results. FIG. 27 illustrates a display similar to that in FIG. 22 for the case where the Do DNS button was selected so the IP addresses are resolved to their registered names.

Figure 28:
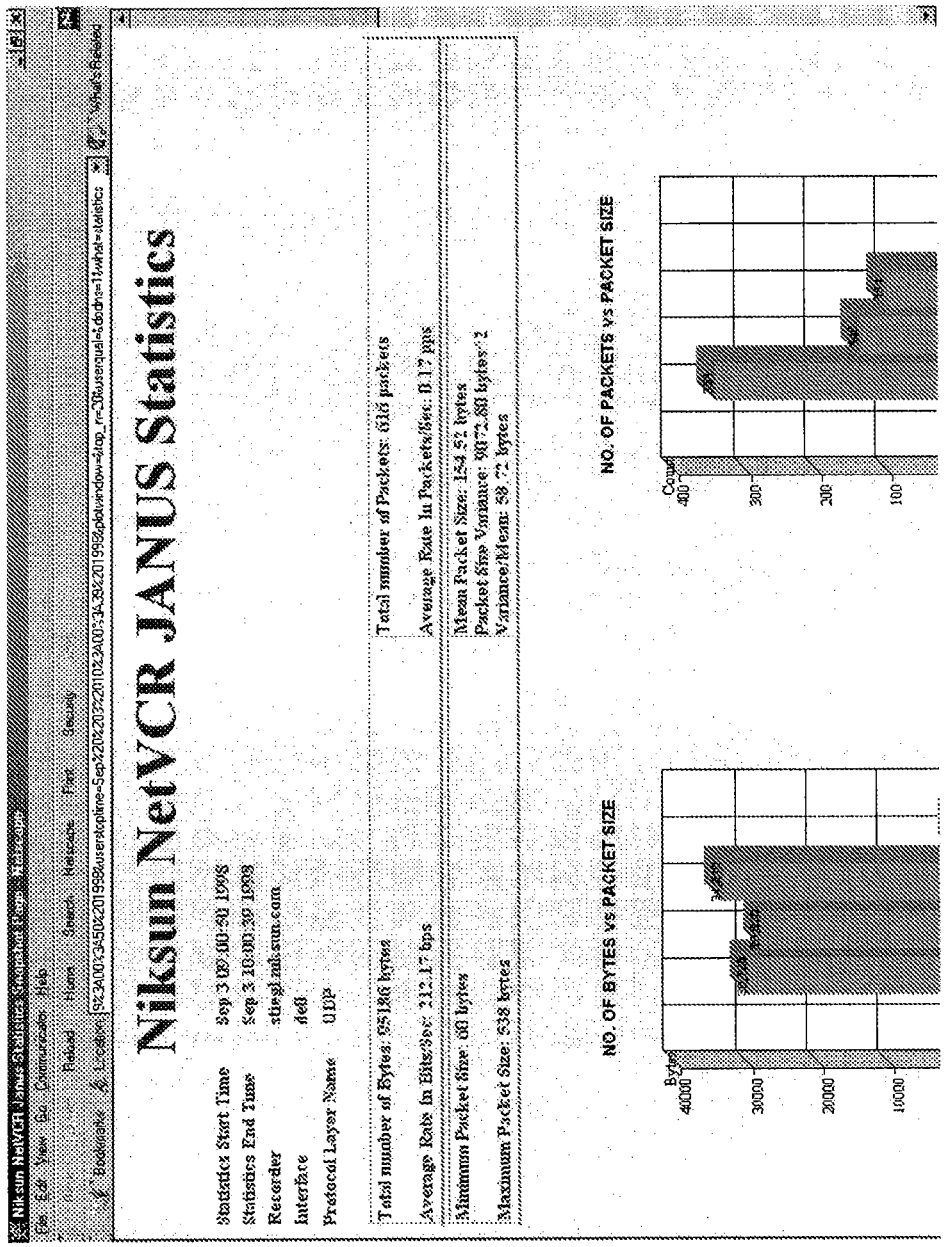

FIG. 28 is a display showing statistics that are displayed upon selection of the "Statistics" button 2208 in the buttons frame 2250 in FIG. 22. Upon selection of the "statistics" button 2208, the network monitor computes various statistics based on data currently being viewed by the user. Exemplary statistics include packet size distributions, protocol distributions, bandwidth usage per client, bandwidth usage by domain, average response time per server, average round-trip time between server-client pair, and performance metrics.

The present invention is not limited to a particular division of functions between the host computer and the interface computer. The functions of the host computer and the interface computer may be performed by a single computer. Interface with a network monitor according to the present invention is not limited to the user interface and may be via the network being monitored or another communication line.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of displaying one or more packet properties or statistics on a display device having a display area, the one or more packet properties or statistics corresponding to packets received from a first communication line, the method comprising:
   (a) displaying at least one parameter defining a subset of the packets received from the first communication line, in a first portion of the display area, wherein the at least one parameter is displayed in at least one user input field and wherein the at least one parameter includes a maximum number of listings and the at least one user input field includes a maximum field for receiving the maximum number of listings;
   (b) displaying a table generated from the one or more packet properties or statistics corresponding to the defined subset of the packets, in a second portion of the display area, wherein displaying the table comprises displaying the table of the one or more packet properties or statistics including only the one or more packet properties or statistics corresponding to the defined subset of the packets within the maximum number of listings received in the maximum field; and
   (c) displaying a plot generated from the one or more packet properties or statistics corresponding to the defined subset of the packets, in a third portion of the display area, the plot having two axes, the packet properties or statistics being represented on one axis of the plot, and time represented on the other axis of the plot.

2. The method according to claim 1 wherein the packets correspond to a plurality of protocols at a protocol layer wherein step (b) includes displaying a table listing each of the plurality of protocols of packets in the defined subset and corresponding statistics.

3. The method according to claim 2, further comprising the steps of detecting selection of one of the plurality of protocols and updating at least one of the table to display packet properties corresponding to packets of the selected protocol or the plot to display a packet properties of the selected protocol.

4. The method according to claim 2, further comprising the steps of detecting selection of one of the plurality of protocols and updating the plot to simultaneously display both the packet properties of the selected protocol and the packet properties of all protocols.

5. The method according to claim 1, wherein the packets are received from the first communication line during an interval of time, the method further comprising the steps of: receiving a selection of a sub-interval of time less than the interval of time by one of entry of times in a text field and selection of a time interval along the time axis of the plot; and updating at least one of the tables and the plots responsive to the selected sub-interval of time.

6. The method according to claim 1, wherein the subset corresponds to a time interval, the method further comprising the steps of receiving a start time and an end time spanning a duration longer than the time interval and updating at least one of the tables and the plots to correspond to the duration.

7. The method according to claim 1 wherein a subset of the packets correspond to a host and the method further comprises detecting selection of the host and displaying statistics corresponding to the subset of packets.

8. The method according to claim 1 wherein the packets correspond to a plurality of protocols and a subset of the packets correspond to one of the plurality of the protocols and the method further comprises detecting selection of the one of the plurality of the protocols and displaying statistics corresponding to the selected one of the plurality of protocols.

9. The method of claim 1, wherein the at least one parameter defines a resolution and the at least one user input field includes at least one interval field for defining the resolution and wherein the displaying the plot comprises:
displaying the plot of the one or more packet properties or statistics based on the defined resolution including only the one or more packet properties or statistics corresponding to the defined subset of the packets.

10. The method of claim 9, further comprising:
regenerating the displayed plot in the third portion in response to a change to the resolution defined in the at least one interval field.

11. The method of claim 1, wherein the at least one user input field is a packet filter field for defining a subset of packets and wherein the displaying the table comprises:
displaying the table of the one or more packet properties or statistics including only the one or more packet properties or statistics corresponding to the defined subset.

12. The method of claim 11, further comprising:
regenerating the displayed table in the third portion in response to a change to the packet type received in the packet filter field.

13. The method of claim 1, further comprising:
displaying at least one performance table.

14. The method of claim 1, further comprising:
displaying a view packets selector in a fourth portion of the display area; and
displaying a packet list including packet properties for all packets within the defined subset of the packets in response to selection of the view packet selector.

15. A system for monitoring a computer network over an interval of time, in which data packets travel across network paths during such time interval, the system comprising:
means for recording the packets substantially continuously during the time interval;
means for extracting packet properties from the recorded packets at multiple, successive sampling times during said time interval, the time from the beginning of the time interval to successive sampling times defining subintervals of time during which the network has been monitored, the subintervals being increasingly longer as packet properties are extracted over successive sampling times during the time interval;
means for tabulating the extracted packet properties for the subintervals to create statistical information;
means for displaying at least one parameter defining a subset of the recorded packets, in a first portion of the display area;
means for displaying a table generated from the packet properties or the statistical information corresponding to the defined subset of the packets, in a second portion of the display area; and
means for displaying a plot generated from the packet properties or the statistical information corresponding to the defined subset of the packets, in a third portion of the display area.

16. The system of claim 15, wherein the recording means includes:
means for detecting the packets travelling over a selected one of the network paths;
means for indexing the detected packets;
means for creating records corresponding to the packets; and
means for storing the records in memory.

17. The system of claim 16, wherein the detecting means includes means for determining packet properties and means for selecting certain ones of the data packets traveling the network path and having a predetermined packet property.

18. The system of claim 16, wherein the indexing means comprises means for timestamping the data packets.

19. The system of claim 18, in which the network is monitored at two points on the network, the system further comprising timestamping means at the two points, and wherein the timestamping means comprises GPS means for synchronizing the indexing of the data packets at the two points.

20. The system of claim 16 further comprising a computer with a data storage device, a network card having network card memory, and a CPU in logical communication with the network card, and wherein the record storing means comprises: means for storing the records on the network card memory; means for detecting relative inactivity of the CPU; and
means for transferring records stored on the network card memory to the data storage device in response to detection of the relative inactivity of the CPU.

21. The system of claim 20, wherein the record storing means further comprises: a long-term storage device having replaceable storage media loaded therein so as to receive data thereon, and a magazine of additional storage media operatively connected to the long-term storage device; means for detecting when the data storage device of the computer contains a predetermined amount of data corresponding to the recorded packets, said predetermined amount of data corresponding to the data storage device being full; means for transferring said data from the data storage device to the long-term storage device in response to detecting the data storage device is full; means for detecting when the replaceable media loaded in the long-term storage device is full; and means for replacing the full storage media with storage media from the magazine.

22. The system of claim 15, wherein the displaying means includes a computer display screen having a graphical user interface and a control program for the graphical user interface, the control program having: means for displaying at least some of the packet properties over time on a graph having two axes, the packet properties being represented on one axis of the graph, the time being represented on the other axis of the graph; means for varying the timescale of the graph in response to user selection; and means for displaying at least some of the statistical information in at least one table adjacent to the graph, the tables having user-selectable cells therein; and means, responsive to selection of one of the cells, for displaying additional statistical information corresponding to the selected cell.

23. The system of claim 15, wherein the means for displaying the at least one parameter defining the subset includes means for displaying the at least one parameter in at least one user input field.

24. The system of claim 23, wherein the at least one user input field includes at least one time field for defining a sub time interval that is less than the time interval and wherein the means for displaying said graphical representation displays said graphical representation including only the statistical information corresponding to the defined subset of the packets within the time interval defined in the at least one time field.

25. The system of claim 23, wherein the at least one parameter defines a resolution and the at least one user input field includes at least one interval field for defining the resolution and wherein the means for displaying the plot comprises means for displaying the plot of the one or more packet properties or statistics based on the defined resolution including only the one or more packet properties or statistics corresponding to the defined subset of the packets.

26. The system of claim 25, wherein the means for displaying said plot further comprises:
means for regenerating said graphical representation in the second portion of the display area in response to a change to the resolution defined in the at least one interval field.

27. A method of displaying one or more packet properties or statistics on a display device having a display area comprising at least one user input field for specifying either numeric representation or textual representation, the one or more packet properties or statistics corresponding to packets received from a first communication line, the method comprising:
(a) displaying at least one parameter defining a subset of the packets received from the first communication line, in a first portion of the display area;
(b) displaying a table generated from the one or more packet properties or statistics corresponding to the defined subset of the packets, in a second portion of the display area, wherein the displaying the table comprises displaying the table with a numeric representation of IP addresses corresponding to the one or more packet properties or statistics when numeric representation is specified and displaying the table with a textual representation of the IP addresses corresponding to the one or more packet properties or statistics when textual representation is specified;
(c) displaying a plot generated from the one or more packet properties or statistics corresponding to the defined subset of the packets, in a third portion of the display area, the plot having two axes, the packet properties or statistics being represented on one axis of the plot, and time represented on the other axis of the plot.

28. A method of displaying one or more packet properties or statistics on a display device having a display area, the one or more packet properties or statistics corresponding to packets received from a first communication line, the method comprising:
(a) displaying at least one parameter defining a subset of the packets received from the first communication line, in a first portion of the display area, wherein the at least one parameter is displayed in at least one user input field and wherein the at least one parameter is a forward command and a backward command and the at least one user input field includes a forward button and a backward button for receiving the forward and backward commands;
(b) displaying a table generated from the one or more packet properties or statistics corresponding to the defined subset of the packets, in a second portion of the display area wherein the displaying the table comprises updating the displayed table in the second portion in response to selection of the forward or backward command while maintaining correspondence among different portions of the display area; and
(c) displaying a plot generated from the one or more packet properties or statistics corresponding to the defined subset of the packets, in a third portion of the display area, the plot having two axes, the packet properties or statistics being represented on one axis of the plot, and time represented on the other axis of the plot.

29. A method of displaying one or more packet properties or statistics on a display device having a display area, the one or more packet properties or statistics corresponding to packets received from a first communication line, the method comprising:
(a) displaying at least one parameter defining a subset of the packets received from the first communication line, in a first portion of the display area
(b) displaying a table generated from the one or more packet properties or statistics corresponding to the defined subset of the packets, in a second portion of the display area;
(c) displaying a plot generated from the one or more packet properties or statistics corresponding to the defined subset of the packets, in a third portion of the display area, the plot having two axes, the packet properties or statistics being represented on one axis of the plot, and time represented on the other axis of the plot;
(d) displaying a recommendation selector in a fourth portion of the display area; and
(e) displaying at least one of capacity recommendations or bandwidth recommendations based on the defined subset of the packets in response to selection of the recommendation selector.

* * * * *